US012593201B2

(12) United States Patent
Ren et al.

(10) Patent No.: US 12,593,201 B2
(45) Date of Patent: Mar. 31, 2026

(54) COMMUNICATION METHOD, COMMUNICATION APPARATUS, AND COMMUNICATION SYSTEM FOR UPDATING USER EQUIPMENT IDENTIFICATION INFORMATION

(71) Applicant: SAMSUNG ELECTRONICS CO., LTD., Suwon-si (KR)

(72) Inventors: Junwei Ren, Beijing (CN); Zhigang Wang, Beijing (CN); Ranran Zhang, Beijing (CN); Jian Zhang, Beijing (CN); Chen Wang, Bijing (CN); Yi Zhao, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 266 days.

(21) Appl. No.: 18/132,129

(22) Filed: Apr. 7, 2023

(65) Prior Publication Data
US 2023/0247413 A1 Aug. 3, 2023

Related U.S. Application Data

(63) Continuation of application No. PCT/KR2021/004129, filed on Apr. 2, 2021.

(30) Foreign Application Priority Data

Oct. 30, 2020 (CN) .......................... 202011194378.1

(51) Int. Cl.
| | |
|---|---|
| *H04W 8/18* | (2009.01) |
| *H04W 8/20* | (2009.01) |
| *H04W 76/30* | (2018.01) |

(52) U.S. Cl.
CPC ............. *H04W 8/183* (2013.01); *H04W 8/20* (2013.01); *H04W 76/30* (2018.02)

(58) Field of Classification Search
CPC ....... H04W 8/183; H04W 76/30; H04W 8/20; H04W 76/11; H04W 76/20; H04W 74/0833; H04W 28/06
See application file for complete search history.

(56) References Cited

U.S. PATENT DOCUMENTS

| | | | | |
|---|---|---|---|---|
| 10,582,371 | B1 | 3/2020 | Abraham et al. | |
| 11,483,736 | B2 * | 10/2022 | Gao .................. | H04W 74/0833 |

(Continued)

FOREIGN PATENT DOCUMENTS

| | | |
|---|---|---|
| CN | 102045314 A | 5/2011 |
| CN | 102238534 A | 11/2011 |

(Continued)

OTHER PUBLICATIONS

Communication issued Feb. 1, 2024 by the European Patent Office in European Patent Application No. 21886457.7.

(Continued)

*Primary Examiner* — Chandrahas B Patel
(74) *Attorney, Agent, or Firm* — Sughrue Mion, PLLC

(57) ABSTRACT

A method of communication by a core network device includes: receiving a message transmitted by a first access network device, the message including a first identifier of a user equipment (UE), assigning to the UE a second identifier corresponding to the first identifier, and transmitting a first request message to the first access network device, the first request message including the second identifier for using the second identifier as an identifier of the UE by the first access network device to communicate with a network device in an Open Radio Access Network (O-RAN).

20 Claims, 14 Drawing Sheets

(56) References Cited

U.S. PATENT DOCUMENTS

| | | | |
|---|---|---|---|
| 2012/0203856 A1 | 8/2012 | Wu et al. | |
| 2016/0249278 A1 | 8/2016 | Qi et al. | |
| 2019/0357103 A1* | 11/2019 | Jin | H04W 36/0079 |
| 2020/0329381 A1 | 10/2020 | Chou et al. | |
| 2022/0353756 A1* | 11/2022 | Li | H04W 36/0033 |
| 2023/0014030 A1* | 1/2023 | Li | H04W 76/10 |

FOREIGN PATENT DOCUMENTS

| | | |
|---|---|---|
| CN | 104871600 A | 8/2015 |
| EP | 3065465 A1 | 9/2016 |
| EP | 3445086 A1 | 2/2019 |
| WO | 2019/183834 A1 | 10/2019 |

OTHER PUBLICATIONS

5G Americas, "Security Considerations for the 5G Era", Sep. 25, 2020. (54 pages total).

Apple, "SOR check during mobility Registration", S2-2007422, 3GPP TSG SA WG2 Meeting #141E, Oct. 27, 2020, pp. 1-31. (33 pages total).

China Mobile, "AUSF/UDM discovery based SUCI information", S2-2007160, 3GPP TSG SA WG2 Meeting #141E, Oct. 2, 2020, pp. 1-13. (15 pages total).

Qualcomm Incorporated, "UE specific DRX for NB-IoT in 5GC", S2-2003163, 3GPP TSG SA WG2 Meeting #138-E, Apr. 10, 2020, pp. 1-28. (30 pages total).

International Search Report (PCT/ISA/210) issued Jul. 20, 2021 by the International Searching Authority in International Patent Application No. PCT/KR2021/004129.

Written Opinion (PCT/ISA/237) issued Jul. 20, 2021 by the International Searching Authority in International Patent Application No. PCT/KR2021/004129.

Communication issued Dec. 22, 2025 by the Korean Intellectual Property Office in Korean Patent Application No. 10-2023-7008171.

Office Action dated Jan. 28, 2026, issued by Chinese Patent Office in Chinese Patent Application No. 202011194378.1.

* cited by examiner

100

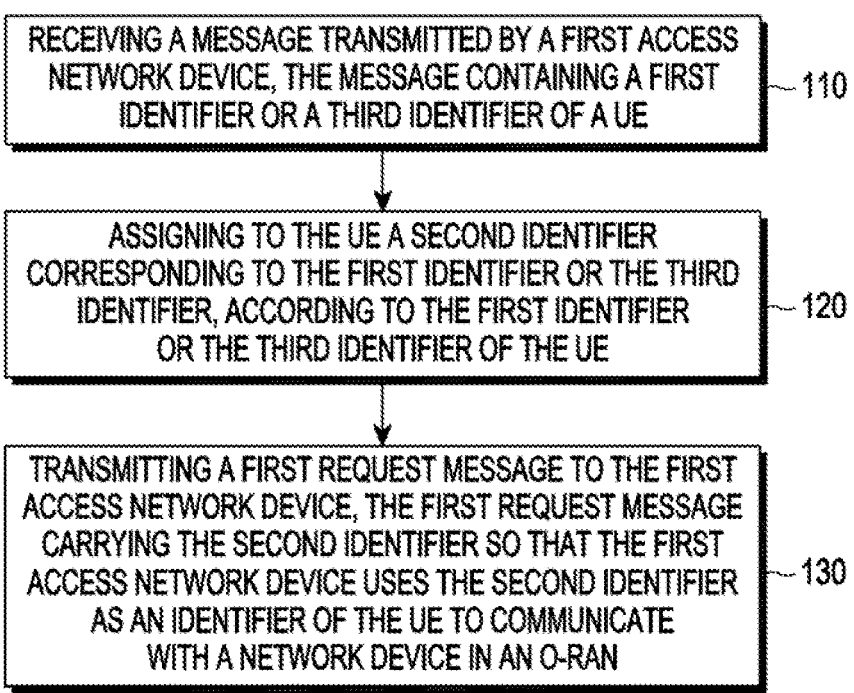

RECEIVING A MESSAGE TRANSMITTED BY A FIRST ACCESS NETWORK DEVICE, THE MESSAGE CONTAINING A FIRST IDENTIFIER OR A THIRD IDENTIFIER OF A UE ~ 110

ASSIGNING TO THE UE A SECOND IDENTIFIER CORRESPONDING TO THE FIRST IDENTIFIER OR THE THIRD IDENTIFIER, ACCORDING TO THE FIRST IDENTIFIER OR THE THIRD IDENTIFIER OF THE UE ~ 120

TRANSMITTING A FIRST REQUEST MESSAGE TO THE FIRST ACCESS NETWORK DEVICE, THE FIRST REQUEST MESSAGE CARRYING THE SECOND IDENTIFIER SO THAT THE FIRST ACCESS NETWORK DEVICE USES THE SECOND IDENTIFIER AS AN IDENTIFIER OF THE UE TO COMMUNICATE WITH A NETWORK DEVICE IN AN O-RAN ~ 130

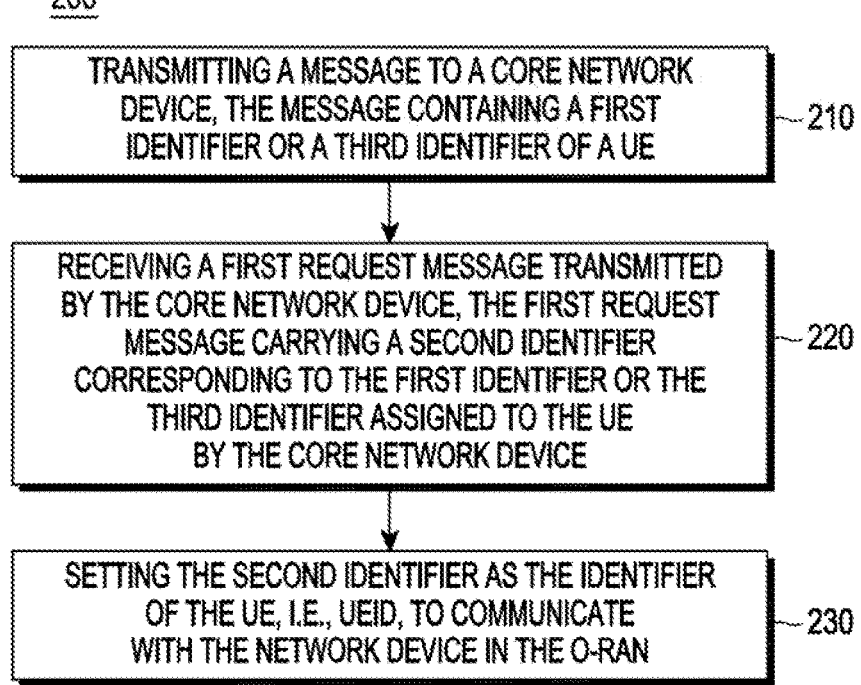

TRANSMITTING A MESSAGE TO A CORE NETWORK DEVICE, THE MESSAGE CONTAINING A FIRST IDENTIFIER OR A THIRD IDENTIFIER OF A UE ~ 210

RECEIVING A FIRST REQUEST MESSAGE TRANSMITTED BY THE CORE NETWORK DEVICE, THE FIRST REQUEST MESSAGE CARRYING A SECOND IDENTIFIER CORRESPONDING TO THE FIRST IDENTIFIER OR THE THIRD IDENTIFIER ASSIGNED TO THE UE BY THE CORE NETWORK DEVICE ~ 220

SETTING THE SECOND IDENTIFIER AS THE IDENTIFIER OF THE UE, I.E., UEID, TO COMMUNICATE WITH THE NETWORK DEVICE IN THE O-RAN ~ 230

RECEIVING A FIRST MESSAGE TRANSMITTED BY A FIRST
ACCESS NETWORK DEVICE, WHEREIN THE UEID
INDICATION MESSAGE CARRIES AN IDENTIFIER OF A UE ~310

COMMUNICATING WITH THE FIRST ACCESS NETWORK
DEVICE USING THE IDENTIFIER OF THE UE ~320

FIG.5

COMMUNICATION METHOD, COMMUNICATION APPARATUS, AND COMMUNICATION SYSTEM FOR UPDATING USER EQUIPMENT IDENTIFICATION INFORMATION

CROSS-REFERENCE TO RELATED APPLICATION(S)

This application is a by-pass continuation of International Application No. PCT/KR2021/004129, filed on Apr. 2, 2021, which is based on and claims priority to Chinese Patent Application No. 202011194378.1, filed on Oct. 30, 2020, in the China National Intellectual Property Administration, the disclosures of which are incorporated by reference herein in their entireties.

BACKGROUND

1. Field

The disclosure relates to the field of communication technologies, in particular to apparatuses and methods for communication.

2. Description of the Related Art

Recently, efforts have been made to develop an improved 5G or pre-5G communication system, in order to meet the increased demand for wireless data traffic since deployment of 4G communication systems. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, techniques including beamforming, massive multiple-input multiple-output (MIMO), Full Dimensional MIMO (FD-MIMO), array antenna, analog beamforming, large scale antenna are discussed in 5G communication systems. In addition, in 5G communication systems, development for system network improvement is underway based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of Things (IoT) where distributed entities, such as things, exchange and process information without human intervention. Also, the Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

An access network of the 5th generation (5G) mobile communication has characteristics of excessive services, large bandwidth, high frequency band, etc., which will lead to a smaller coverage of single station, an increase in device complexity, an increase in network construction scale, a huge network cost and a risk increase in investment return. Combined with these specific characteristics and requirements, the field of a wireless access network needs to introduce develop and design ideas that integrate with new information technology, communication technology and digital technology.

Therefore, telecommunication operators, are integrating Centralized Radio Access Network (C-RAN) alliance and Extensible Radio Access Network (xRAN) forum, leading establishment of Open Radio Access Network (O-RAN) industry alliance, and providing two core visions of "openness" and "intelligence", with an intent to build an open and intelligent wireless network by using big data, machine learning and artificial intelligence technology, and reduce the cost of the wireless network simultaneously combining open standards, white box hardware and open source software.

SUMMARY

Provided are methods, systems and apparatuses technical issues and/or defects. may address a technical problem related to updating user equipment (UE) identity (UEID), since the update of UEID in each network device cannot be synchronized when the network state of the UE changes in the related art systems, resulting in the relevant information being not unavailable. However, the disclosure is not limited to addressing and/or solving any of the above mentioned issues, and thus the disclosure should be considered as limiting to a particular problem.

According to an aspect of the disclosure, there is provided a method of communication by a core network device, the communication method including: receiving a message transmitted by a first access network device, the message including a first identifier of a user equipment (UE); assigning to the UE a second identifier corresponding to the first identifier; and transmitting a first request message to the first access network device, the first request message including the second identifier assigned to the UE, the second identifier to be set as an identifier of the UE by the first access network device to communicate with a network device in an Open Radio Access Network (O-RAN), wherein the first identifier is associated with one of an International Mobile Subscriber Identifier (IMSI), a Globally Unique Temporary UE Identifier (GUTI) and a Serving-Temporary Mobile Subscriber Identifier (S-TMSI).

The core network device may be an Access and Mobility management Function entity (AMF) or a Mobility Management Entity (MME) and the first access network device may be an Open Centralized Unit (O-CU) or an open distributed unit (O-DU).

The assigning to the UE the second identifier corresponding to the first identifier may include: assigning to the UE the second identifier corresponding to the first identifier, based on a mapping relationship between the first identifier and the second identifier.

The method may further include, before the assigning to the UE the second identifier: assigning to the UE a third identifier associated with the GUTI or the S-TMSI and establishing a mapping relationship between the first identifier, the second identifier and the third identifier.

The method may further include transmitting a second request message to the first access network device, the second request message including an updated second identifier and the second identifier corresponding to the third identifier, the updated second identifier to be set as a new identifier of the UE by the first access network device to communicate with the network device in the O-RAN.

The method may further include updating the mapping relationship based on the updated second identifier.

The method may further include assigning to the UE an updated third identifier, and updating the mapping relationship based on the updated third identifier.

The method may further include based on a set timer expiring, transmitting a release message to the network device in the O-RAN, and releasing the mapping relationship between the first identifier and the second identifier, wherein the release message includes the second identifier of the UE.

The method may further include receiving a third request message from a Service Management Orchestrator (SMO) in the O-RAN, the third request message including the second identifier to request data of the UE on an external device; determining the first identifier corresponding to the second identifier according to the mapping relationship between the first identifier and the second identifier; transmitting a fourth request message to the external device, the fourth request message including the first identifier to request the data of the UE on the external device; receiving a fourth response message from the external device, the fourth response message including the first identifier and the data of the UE; determining the second identifier according to the mapping relationship between the first identifier and the second identifier; and transmitting a third response message to the SMO, the third response message including the second identifier and the data of the UE.

The network device in the O-RAN may include a Non-Real-Time radio access network (RAN) Intelligent Controller (Non-RT RIC) and a Near-real-time RAN Intelligent Controller (nRT RIC), and wherein the Non-RT RIC is located in a Service Management Orchestrator (SMO).

According to an aspect of the disclosure, there is provided a communication method by a first access network device, the communication method including: transmitting a message to a core network device, the message including a first identifier of a user equipment (UE); receiving a first request message from the core network device, the first request message including a second identifier corresponding to the first identifier assigned to the UE by the core network device; and setting the second identifier as an identifier of the UE, to communicate with a network device in an Open Radio Access Network (O-RAN), wherein the first identifier is associated with one of an International Mobile Subscriber Identifier (IMSI), the a Globally Unique Temporary UE Identifier (GUTI) and a Serving-Temporary Mobile Subscriber Identifier (S-TMSI).

The communication method may further include receiving a second request message from the core network device, the second request message including an updated second identifier and the second identifier corresponding to a third identifier associated with the GUTI or the S-TMSI; and setting the updated second identifier as a new identifier of the UE, to communicate with the network device in the O-RAN.

According to an aspect of the disclosure, there is provided a core network device including: a transceiver; and a processor configured to: receive through the transceiver, a message transmitted by a first access network device, the message including a first identifier of a user equipment (UE); assign to the UE a second identifier corresponding to the first identifier; and transmit, through the transceiver, a first request message to the first access network device, the first request message including the second identifier assigned to the UE the second identifier to be set as an identifier of the UE by the first access network device to communicate with a network device in an Open Radio Access Network (O-RAN), wherein the first identifier is associated with one of an International Mobile Subscriber Identifier (IMSI), a Globally Unique Temporary UE Identifier (GUTI) and a Serving-Temporary Mobile Subscriber Identifier (S-TMSI).

The processor may be further configured to: transmit, through the transceiver, a second request message to the first access network device, the second request message including an updated second identifier and the second identifier corresponding to a third identifier associated with the GUTI or the S-TMSI, the updated second identifier to be set as a new identifier of the UE by the first access network device to communicate with the network device in the O-RAN.

The processor may be further configured to: assign the third identifier to the UE before assigning of the second identifier to the UE, and establish a mapping relationship between the first identifier, the second identifier and the third identifier.

According to another aspect of the disclosure, there is provided a first access network device including: a transceiver; and a processor configured to: transmit a message to a core network device, the message including a first identifier of a user equipment (UE); receive a first request message from the core network device, the first request message including a second identifier corresponding to the first identifier assigned to the UE by the core network device; and set the second identifier as an identifier of the UE, to communicate with communicating with a network device in an Open Radio Access Network (O-RAN), wherein the first identifier is associated to an International Mobile Subscriber Identifier (IMSI), a Globally Unique Temporary UE Identifier (GUTI) and a Serving-Temporary Mobile Subscriber Identifier (S-TMSI).

One or more embodiments of the disclosure, may provide an advantageous effect, in that the UEID is not associated with IMSI/SUCI/SUPI when assigning the UEID, and therefore, security is ensured and the UEID in each network device may be ensured to be updated synchronously, thus avoiding the problem of non-correspondence information.

BRIEF DESCRIPTION OF THE DRAWINGS

The above and other aspects, features, and advantages of certain embodiments of the present disclosure will be more

Figure 1:
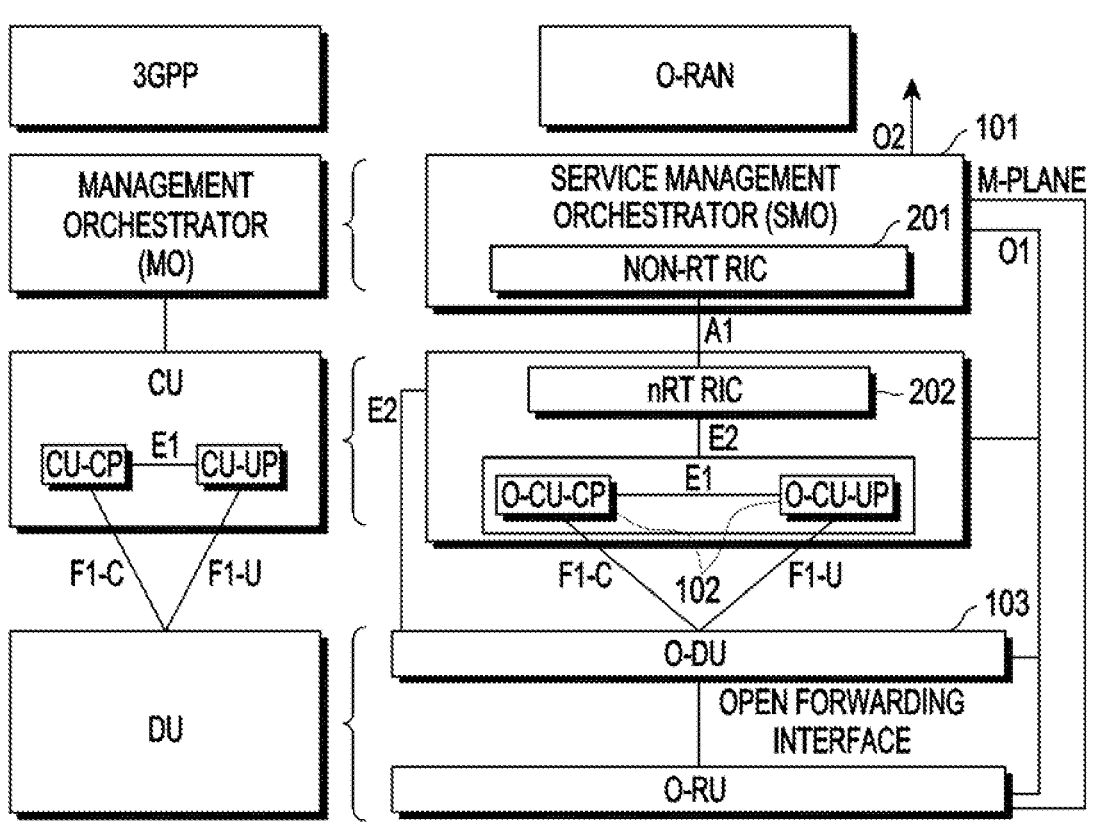
Figure 2:
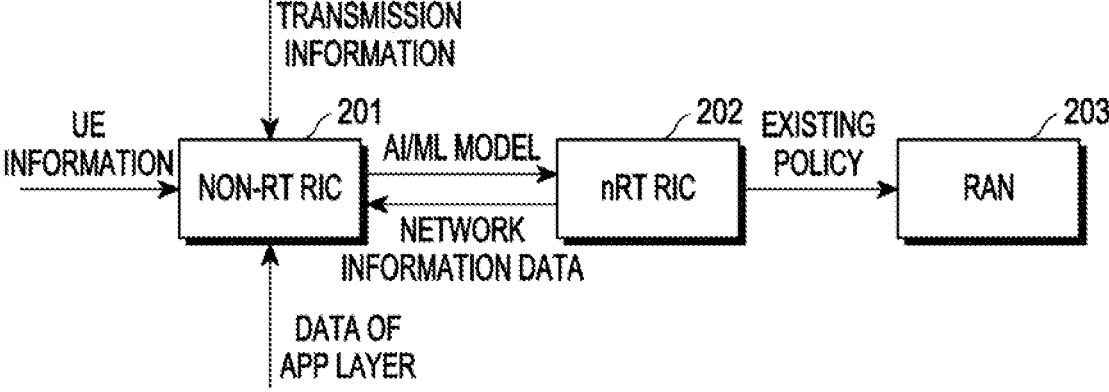
Figure 6A:
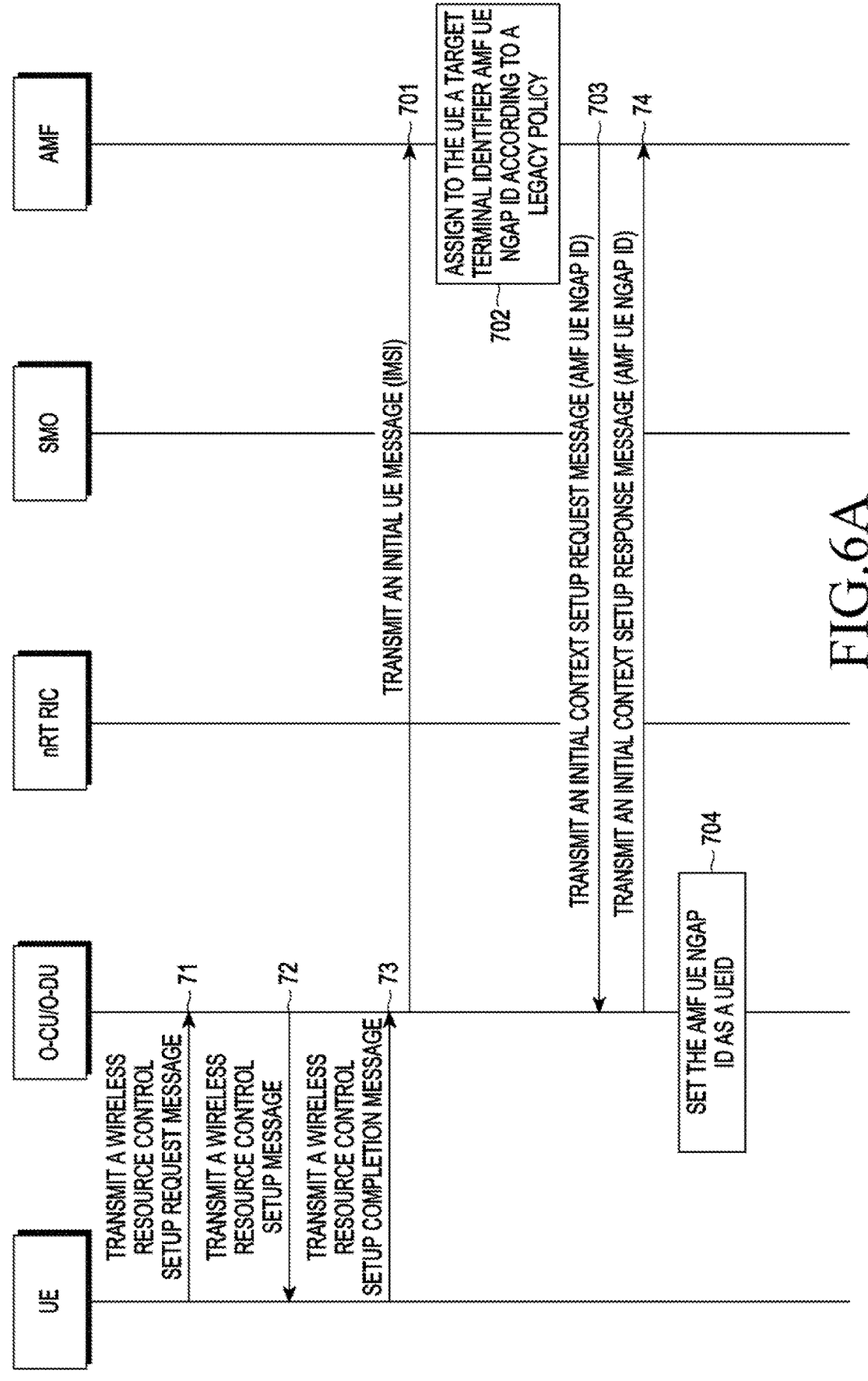
Figure 6B:
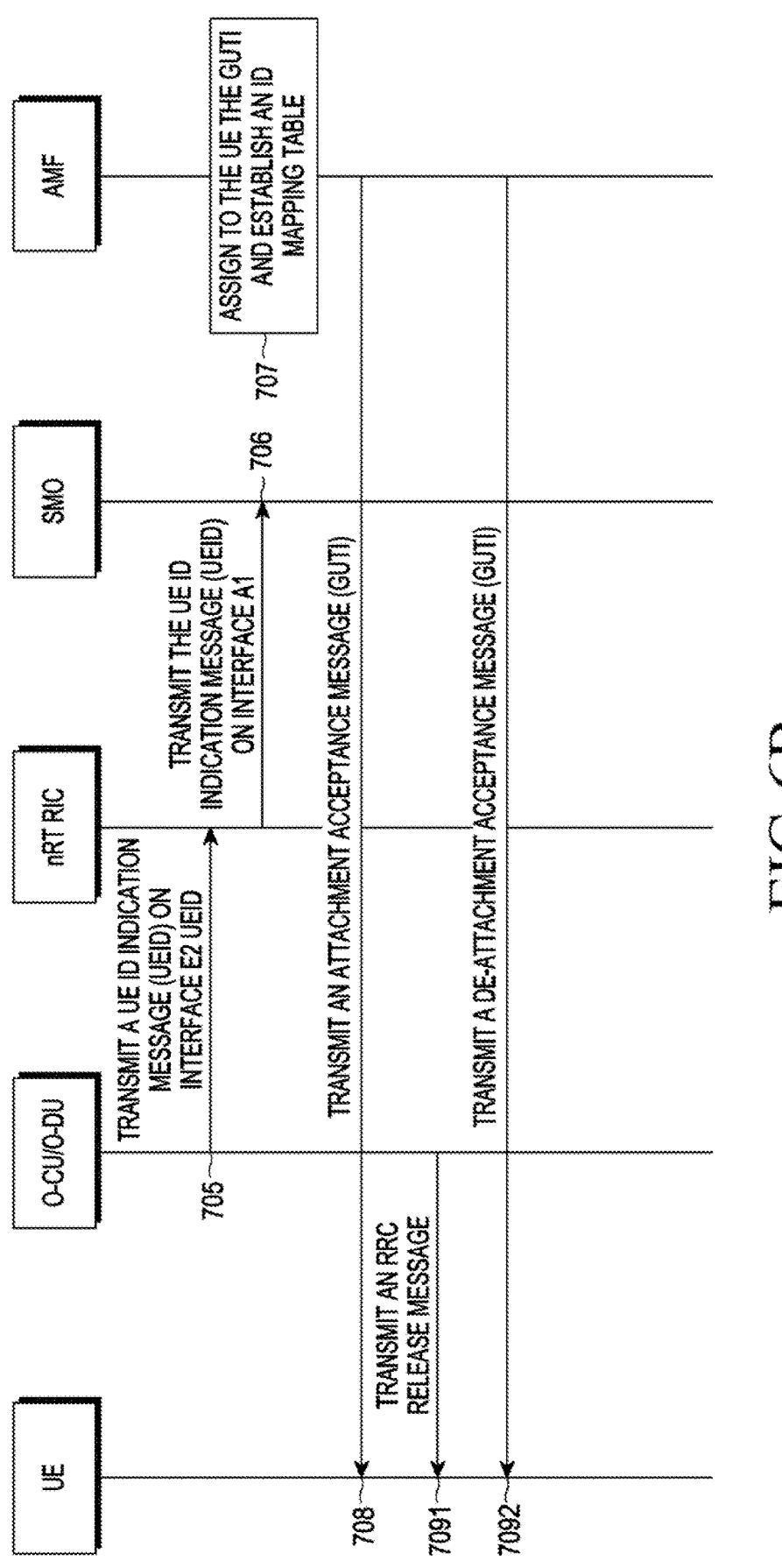
Figure 7A:
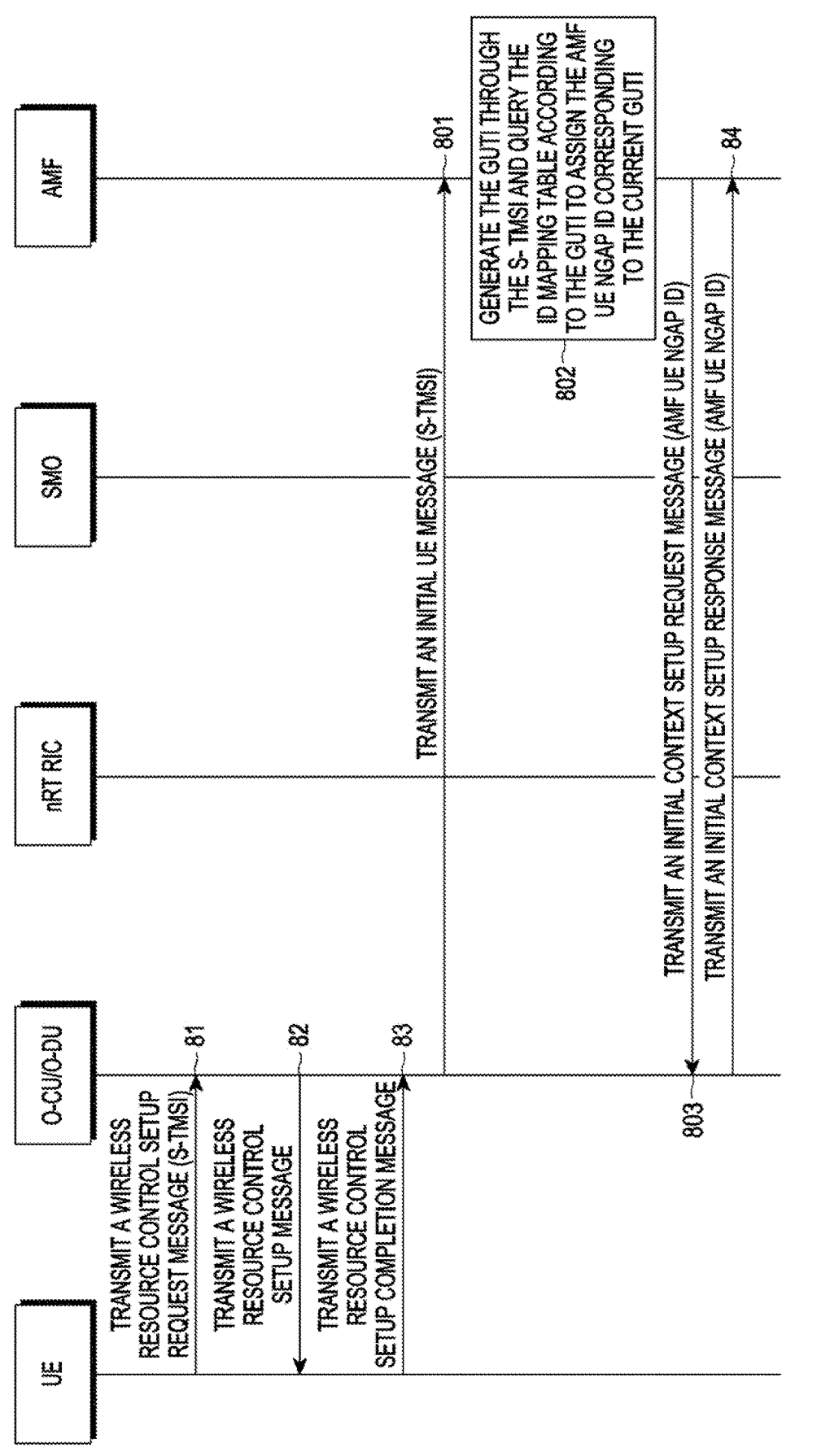
Figure 7B:
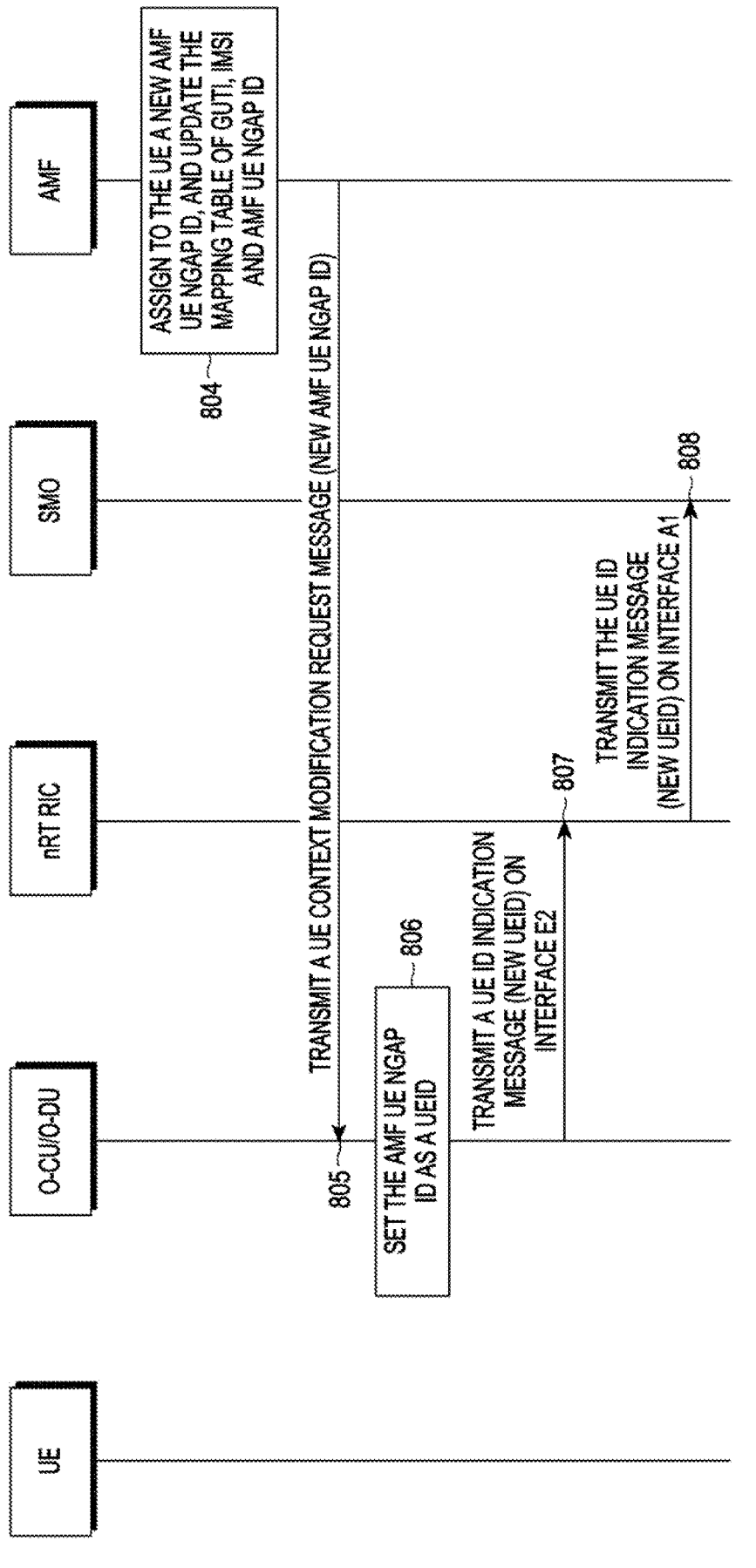
Figure 8A:
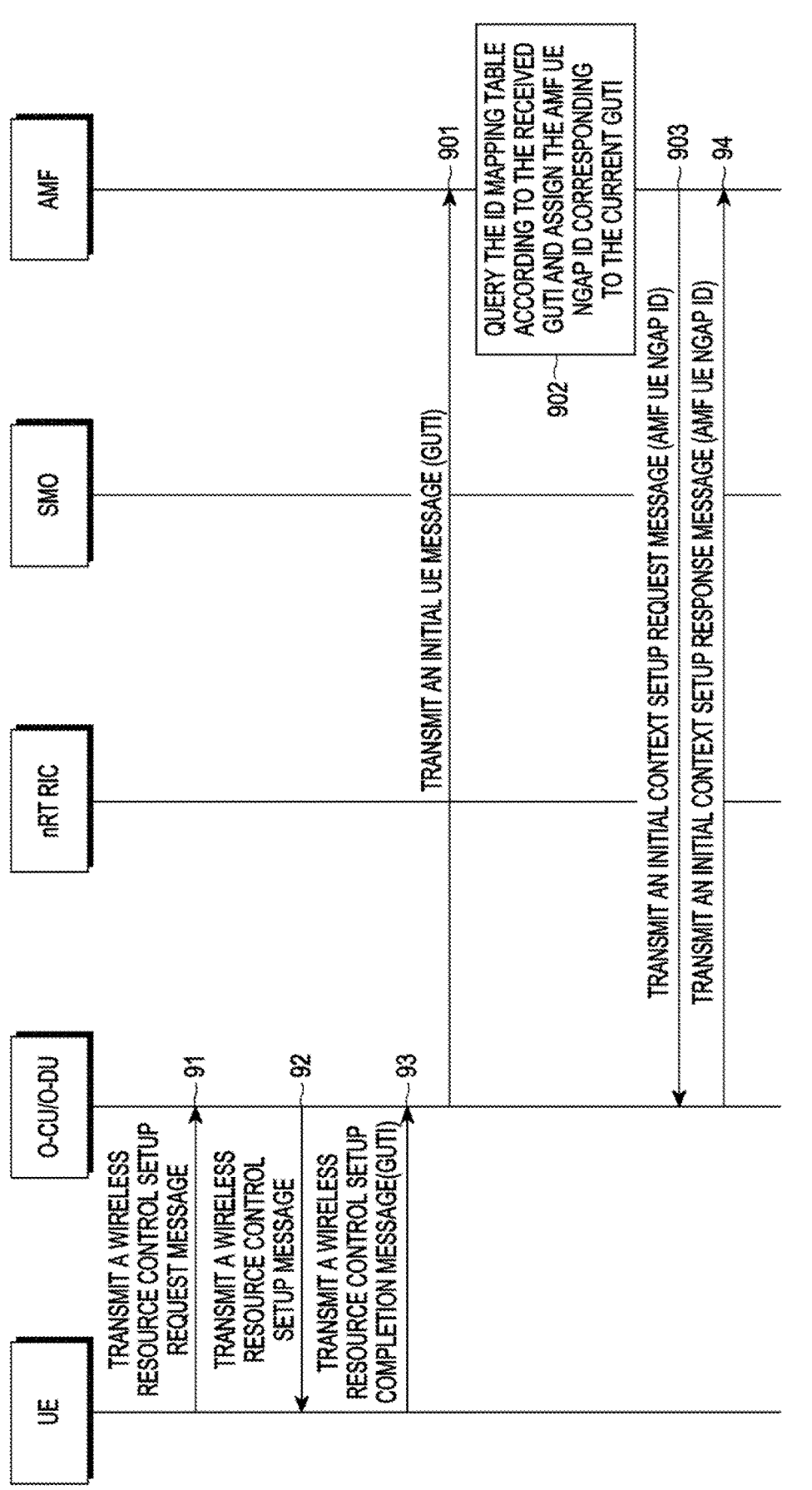
Figure 8B:
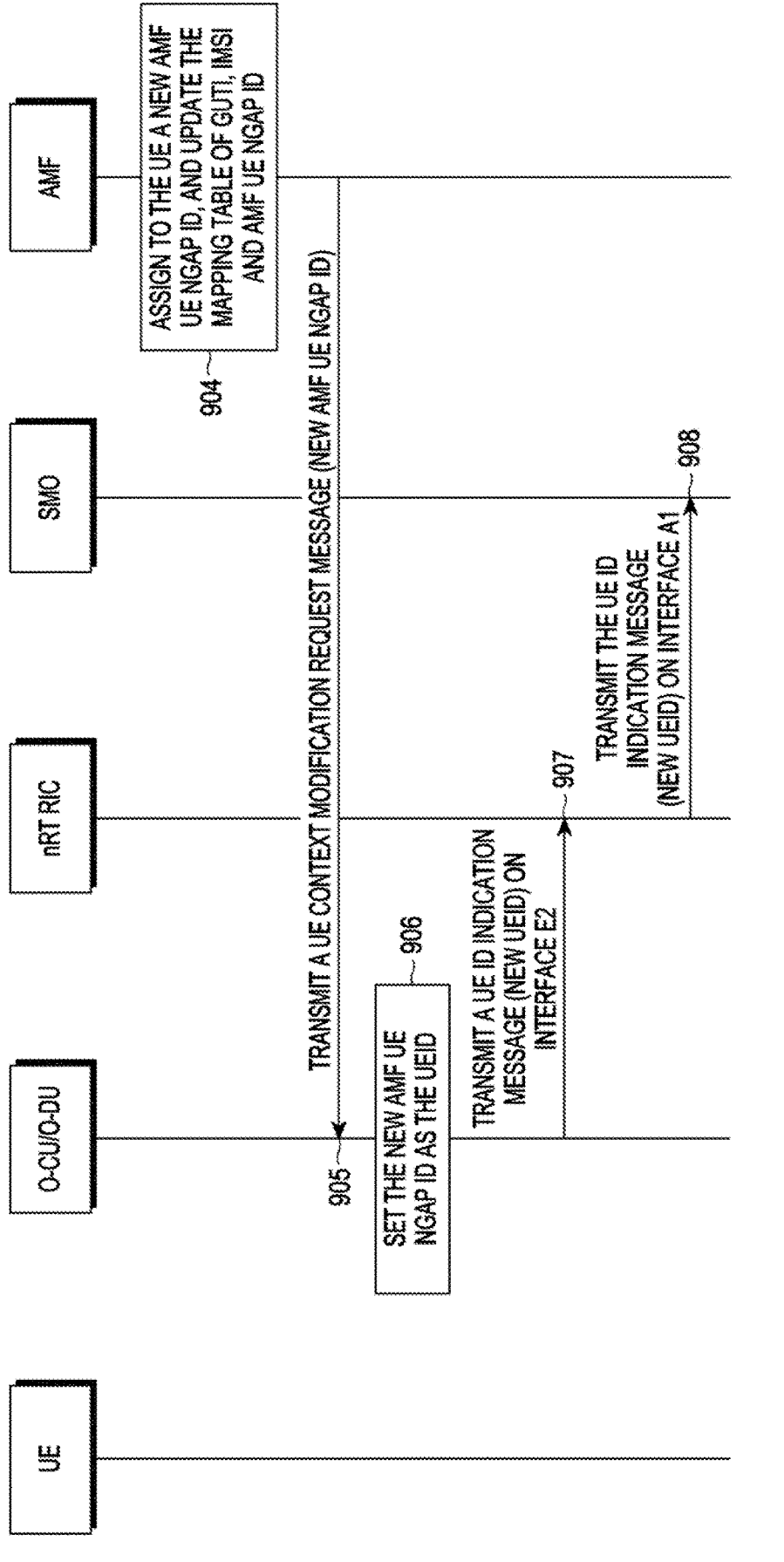
Figure 9:
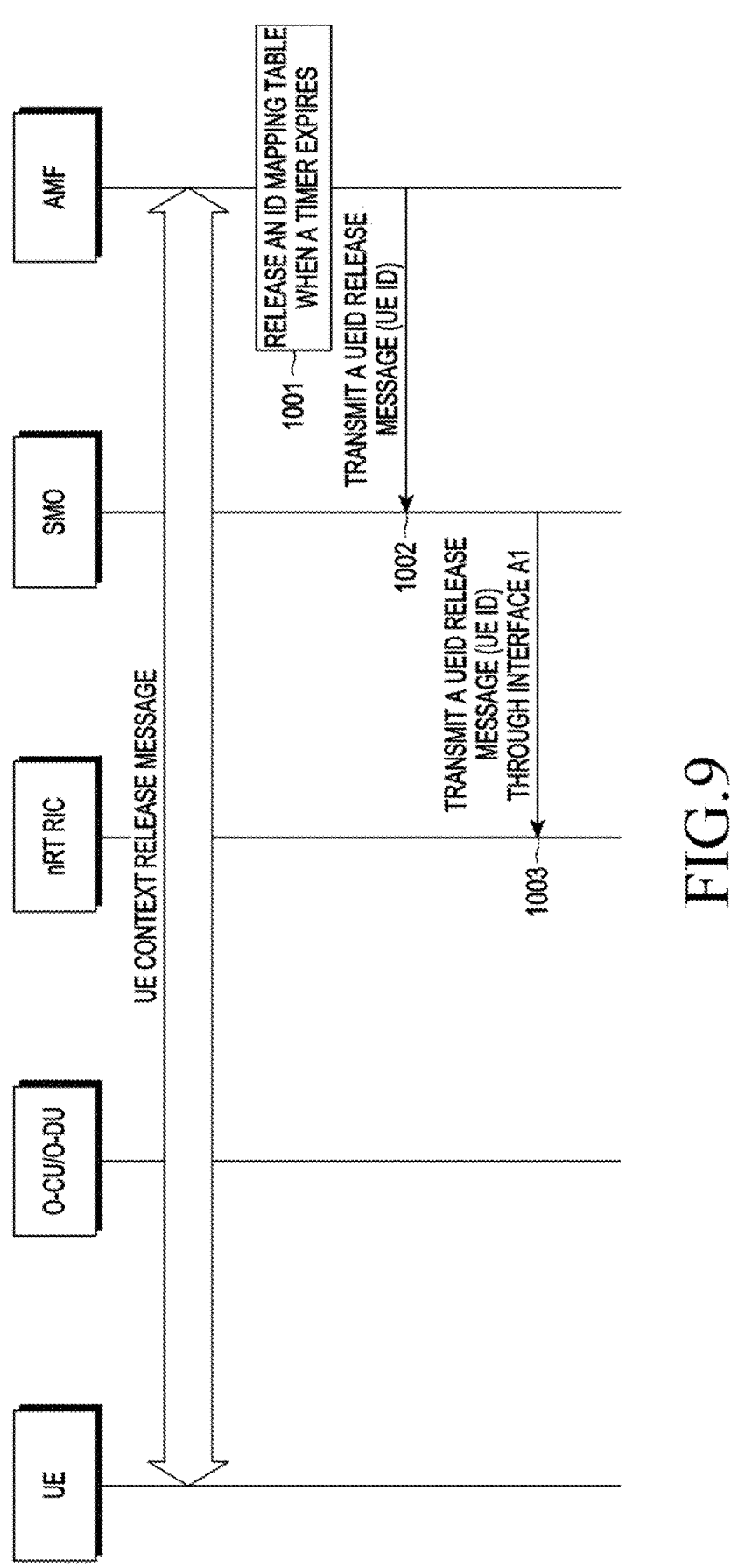
Figure 10A:
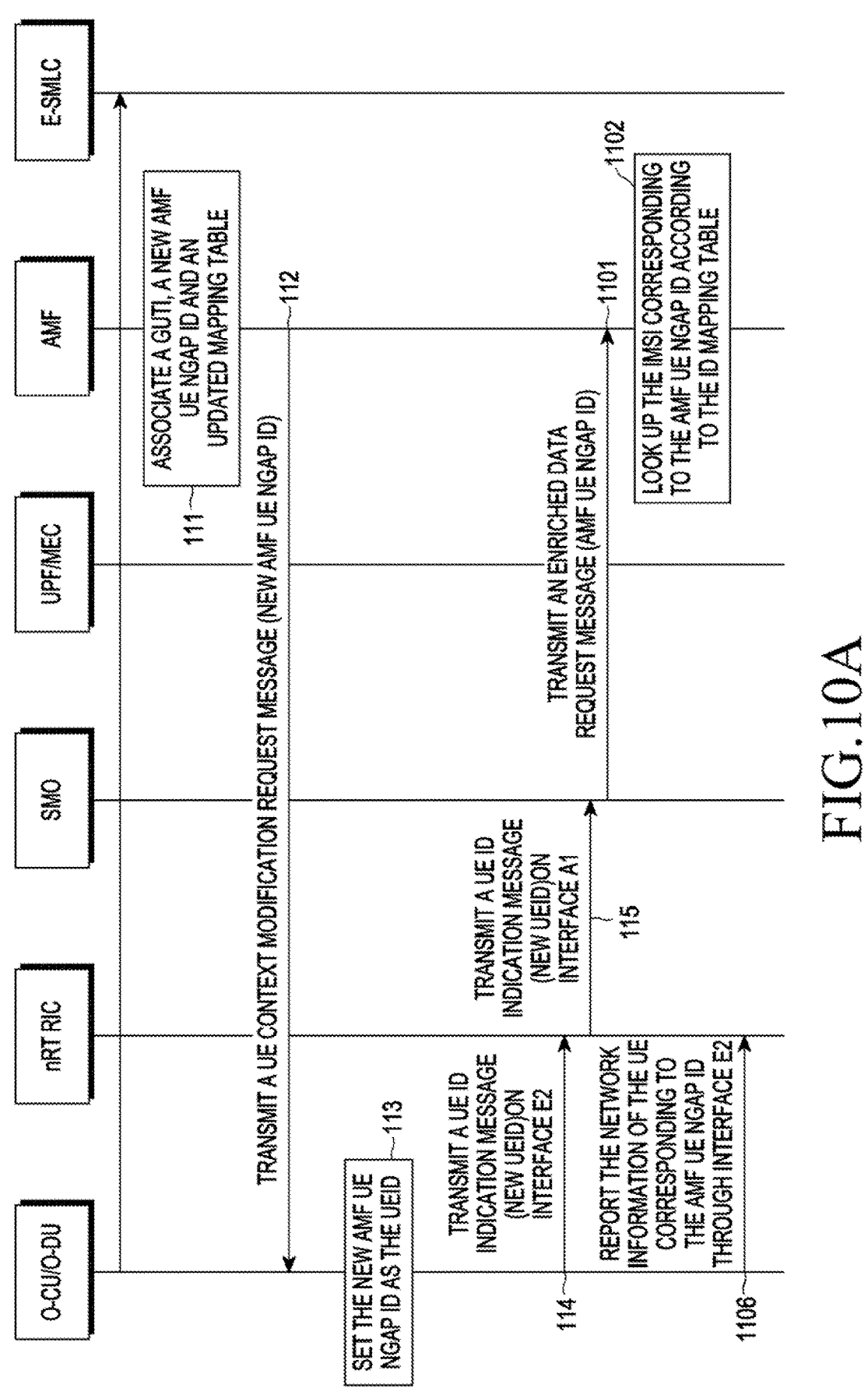
Figure 10B:
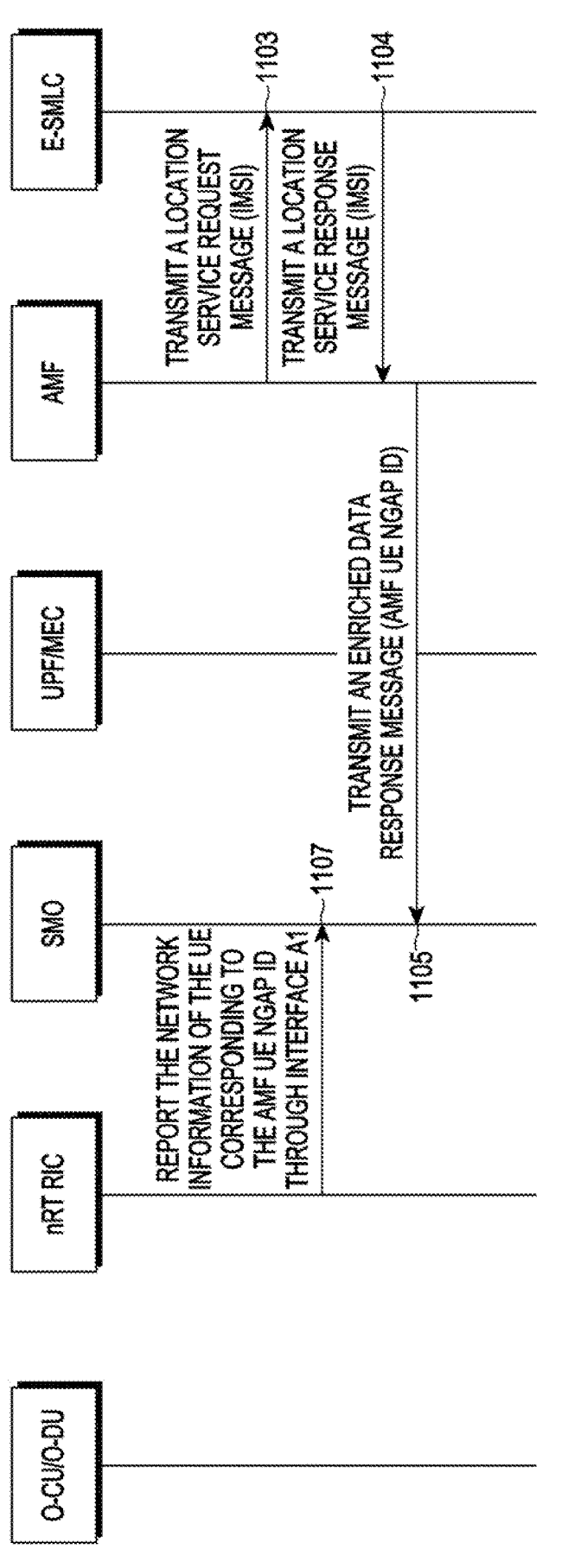
Figure 11:
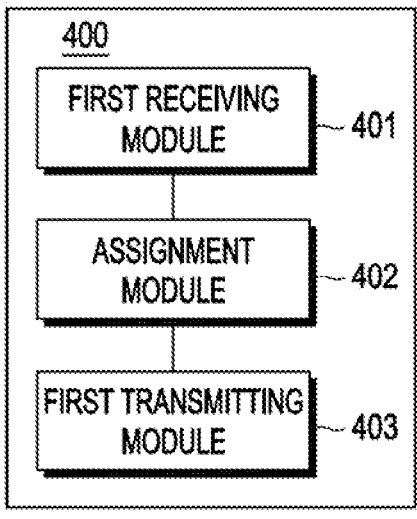
Figure 12:
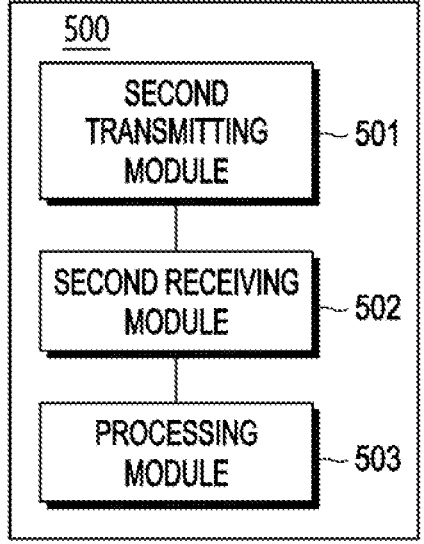
Figure 13:
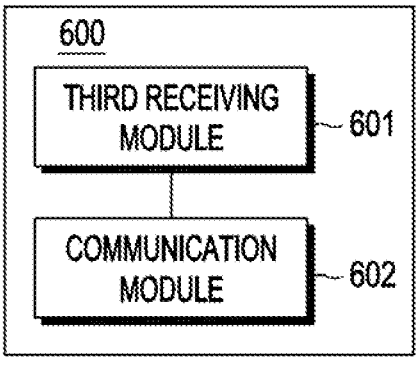
Figure 14:
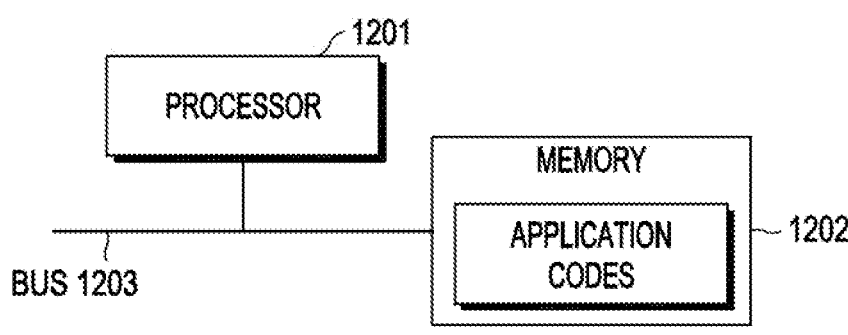

5 apparent from the following description taken in conjunction with the accompanying drawings, in which:

FIG. 1 is an architecture diagram of a related art technology;

FIG. 2 is a schematic diagram of the relevant technology;

FIG. 3 is a flowchart illustrating a communication method according to an example embodiment of the disclosure;

FIG. 4 is a flowchart illustrating a communication method according to another example embodiment of the disclosure;

FIG. 5 is a flowchart illustrating a communication method according to another example embodiment of the disclosure;

FIG. 6A is a diagram illustrating an information interaction process of a communication method according to an example embodiment of the disclosure;

FIG. 6B is a diagram illustrating an information interaction process of a communication method according to an example embodiment of the disclosure;

FIG. 7A is a diagram illustrating an information interaction process of a communication method according to another example embodiment of the disclosure;

FIG. 7B is a diagram illustrating an information interaction process of a communication method according to another example embodiment of the disclosure;

FIG. 8A is a diagram illustrating an information interaction process of a communication method according to another example embodiment of the disclosure;

FIG. 8B is a diagram illustrating an information interaction process of a communication method according to another example embodiment of the disclosure;

FIG. 9 is a diagram illustrating an information interaction process of a communication method according to another example embodiment of the disclosure;

FIG. 10A is a diagram illustrating an information interaction process of a communication method according to another example embodiment of the disclosure;

FIG. 10B is a diagram illustrating an information interaction process of a communication method according to another example embodiment of the disclosure;

FIG. 11 is a schematic structural diagram of a communication equipment according to an example embodiment of the disclosure;

FIG. 12 is a schematic structural diagram of a communication equipment according to another example embodiment of the disclosure;

FIG. 13 is a schematic structural diagram of a communication equipment according to another example embodiment of the disclosure; and FIG. 14 is a schematic structural diagram of an electronic device according to an example embodiment of the disclosure.

DETAILED DESCRIPTION

Embodiments of the disclosure are described in detail below, examples of which are shown in the accompanying drawings, in which identical or similar reference numerals denote identical or similar elements or elements having identical or similar functions throughout. The embodiments described below by reference to the accompanying drawings are exemplary and are intended only to explain the disclosure and are not to be construed as limiting the disclosure.

As may be understood by those skilled in the art, the singular forms "a", "an", "said" and "the" used herein may also include plural forms unless expressly stated. It should be further understood that the word "including" used in the specification of the application means the presence of stated features, integers, steps, operations, elements and/or components, but does not exclude the presence or addition of one or more other features, integers, steps, operations, elements, components and/or groups thereof. It should be understood that when we say that an element is "connected" or "coupled" to another element, it may be directly connected or coupled to other elements, or there may be intermediate elements. In addition, "connected" or "coupled" as used here may include wirelessly connected or wirelessly coupled. The word "and/or" as used herein includes all or any of the units and all combinations of one or more of the associated listed items.

FIG. 1 illustrates the network architecture of 3GPP and an Open Radio Access Network (O-RAN). The O-RAN may be implemented by software implementation, virtualization, flexibility and intelligence. O-RAN uses open and standardized interfaces, virtualized network elements, open-source software and a unified hardware reference architecture, of which the architecture is shown in FIG. 1.

3GPP introduces the separation architecture of Centralized Unit (CU) and Distributed Unit (DU), and defines an interface E1 between CU control plane (CU-CP) and CU user plane (CU-UP), and an interface F1 between CU and DU.

O-RAN network functional entity also include an Open Centralized Unit (O-CU) (102) and an Open Distributed Unit (O-DU) (103). The O-CU (102) is a logical node carrying data of a control plane part of RRC and PDCP protocols. Compared with CU in the non-O-RAN system, O-CU additionally supports the E2 interface. The O-CU (102) software module helps support data provisioning to Real-time RAN Intelligent Controller (nRT RIC) (202) and Non-real-time RAN Intelligent Controller (Non-RT RIC) (201), and executes QoS enforcement decisions from the nRT RIC. The O-DU (103) is a logical node carrying data of a RLC/MAC/High-PHY layer. The PHY layer may be divided into the High-PHY layer and a Low-PHY layer in the O-RAN based system. For example, the High-PHY and Low-PHY layers may refer to 3GPP TR 38.801. Compared with DU in the non-O-RAN system, O-DU (103) additionally supports the E2 interface.

Service Management and Orchestration (SMO) (101) is newly introduced into O-RAN, which is responsible for managing network functions and NFVI infrastructure, and its management interfaces and management contents are as follows:

O1 interface: responsible for managing network functions, including configuration, alarming, performance, security management, etc.;

O2 interface: responsible for managing the resources and load management of cloud platform; and M-Plane interface: responsible for managing O-RU.

Moreover, O-RAN introduces two controllers, namely a Non-RT RIC (201) and a nRT RIC (202) on the management layer and RAN side, and adds new interfaces such as A1, E2, O1 and O2 at the same time.

O-RAN's newly introduced Non-RT RIC and nRT RIC may realize RAN intelligent and improve user experience through artificial intelligence (AI) and machine learning (ML). The functions of the Non-RT RIC and the nRT RIC and their workflow are shown in FIG. 2.

Non-RT RIC (201) is responsible for processing services with delay requirements greater than 1 second, such as data analysis, AI model training, etc. Non-RT RIC (201) is located within SMO (101) and performs data analysis and AI training according to relevant data collected from RAN and application servers, such as UE service and capability information and network data (including: wireless network quality information, cell information, handover information, etc.), and issues the training model and policy down to the nRT RIC (202) deployed in RAN (203) through the interface A1.

Non-RT RIC (201) has a functions of microservice and policy management, wireless network analysis, and Artificial Intelligence (AI)/Machine Learning (ML) model training, etc. In an example, the microservice may be a service that can deploy application(s) and/or service(s) in a cloud network. The Non-RT RIC may process non-real time services that require a delay, such as the microservice and policy management, the wireless network analysis, and the AI/ML model training, etc.

8

2. UEID may be used for both 5G and LTE; and 3. 3GPP specification cannot be modified.

Accordingly, there is a need to have a uniform terminal identifier in O-RAN.

Related art UEID solutions include using 5G-GUTI and AMF UE NGAP ID as UEID, wherein, <5G-GUTI>=<GUAMI><5G-TMSI>, <GUAMI>=<MCC><MNC><AMF Identifier>

<AMF Identifier>=<AMF Region ID><AMF Set ID><AMF Pointer>

<TMSI>=<AMF Set ID><AMF Pointer><5G-TMSI>

TABLE 1

| 5G-GUTI | | | | | |
|---|---|---|---|---|---|
| GUAMI | | | | | 5G-TMSI |
| MCC | MNC | AMF Identifier | | | (32) |
| (3digit) | (3digit) | AMF Region ID (8) | AMF Set ID (10) | AMF Pointer (6) | |
| | | | 5G-S-TMSI | | |

The nRT RIC (202) is responsible for processing services with latency requirements less than 1 second (50 ms-200 ms), e.g., wireless resource management, handover decision, dual-connection control, load balancing, etc. The nRT RIC is responsible for collecting and analyzing immediate information of RAN (e.g., network information data) and feeding it back to Non-RT RIC through interface A1. Meanwhile, according to the training model and policy issued by Non-RT RIC, the network and user behavior changes are monitored and predicted in real time, and the RAN parameters are adjusted in real time according to the policy (e.g., QoE target), including: adjusting resource assignment, priority, handover, etc.

The nRT RIC is near-real time control and optimization of wireless resources through near-real time data collection and processing. It may also include training, inferring and updating of Artificial Intelligence (AI)/Machine Learning, (ML) models. The nRT RIC may process near-real time services with a delay less than that of the non-real time services, the near-real time services may be services such as training, inferring and updating of AI/ML models, and optimization of wireless resources, etc.

As illustrated in FIG. 2, the input information required by the Non-RT RIC includes information about the UE and the corresponding wireless network. For example, the information about the UE may be location information of the UE, which the Non-RT RIC may only obtain from a location server through an external interface. The information of the wireless network is acquired by the nRT RIC from RAN side. However, the identifier of the UE provided by the location server and the identifier of the UE provided by RAN are not the same, so the Non-RT RIC cannot determine the specific UE after obtaining the above information.

In addition, the network state of the UE may be classified as an active state and idle state. When a UE enters the idle state from the active state and then enters the active state again, RAN cannot correlate the network information of two active states of the same UE.

Based on the above two issues, O-RAN proposes to add a new terminal identifier UEID and unify the UEID to uniquely identify a UE in the three modules of RAN, Non-RT RIC and nRT RIC. At the same time, it is stipulated that the UEID should meet the following principles:

1. security rules cannot be broken, i.e., UEID cannot be associated with IMSI/SUCI/SUPI;

The AMF UE NGAP ID is assigned to uniquely identify the UE through the NG interface in the AMF. Upon receiving the AMF UE NGAP ID, the NG-RAN node may store the AMF UE NGAP ID for the duration of the logical NG connection associated with the UE for that UE and include the AMF UE NGAP ID in all NGAP signaling associated with the UE. 3GPP TS 23.501 specifies that the AMF UE NGAP ID is unique within the AMF set. When the UE is detached, the core network reassigns the 5G-GUTI to the UE and also releases the AMF UE NGAP ID. When the UE is attached again, the latest assigned 5G-GUTI may be used to access the network, and at the same time, the AMF UE NGAP ID assigned by the core network may be changed.

After the UE is detached, the core network may reassign the 5G-GUTI to the UE, and when the UE enters the idle state, the core network may release the AMF UE NGAP ID. When the UE enters the active state from the idle state again, the UE may use the latest assigned 5G-GUTI to access the network, and at the same time, the AMF UE NGAP ID assigned by the core network may be changed.

In the above two scenarios, the nRT RIC may use the latest assigned 5G-GUTI and AMF UE NGAP ID as the new UE ID to identify the UE. The nRT RIC is unable to correspond the new UEID to the original already assigned UEID (the original already assigned UEID is the 5G-GUTI and AMF UE NGAP ID before de-attachment). As a result, the data previously collected for the UE and the AI models trained may not be available for further use.

To overcome the above problems, another related art solution is proposed, in which, UEID is associated with SUPI/SUCI. However, the scheme violates the principle of UEID assignment and associates UEID with IMSI, which may have security problems.

Therefore, to solve the above problems, the disclosure provides a communication method including a new UEID assignment, a scheme to update and release, and a flow of information interaction, in which the UEID is not associated with IMSI/SUCI/SUPI when it is assigned, ensuring security, and it may ensure the UEID in each network device is updated synchronously, thus avoiding the problem of non-correspondence of information.

The technical solution of the disclosure and how the technical solution of the disclosure solves the above technical problems are described in detail below with one or more example embodiments. These example embodiments below may be combined with each other and may not be repeated in some embodiments for the same or similar concepts or processes. Embodiments of the disclosure may be described below in conjunction with the accompanying drawings.

According to an aspect of the disclosure, there is provided a communication method including a new scheme of UEID assignment, update, and release, and a flow of information interaction.

According to an example embodiment, there is provided a core network device, which establishes and maintains an identifier ID mapping relationship for the UE, which is a mapping relationship between the first identifier, the second identifier and the third identifier. This ID mapping relationship may be represented in the form of a mapping relationship table. According to an example embodiment, the device may be 5G core network device: Access and Mobility Management Function entity (AMF), or, 4G core network device: Mobility Management Entity MME, both simplified as AMF below for descriptive convenience. According to an example embodiment, the first identifier may be International Mobile Subscriber Identifier (IMSI), the second identifier may be AMF UE NGAP ID (ID assigned by AMF in 5G core network) or MME S1AP ID (ID assigned by MME in 4G core network), which are both abbreviated as AMF UE NGAP ID for the convenience of description, and the third identifier is a Globally Unique Temporary Identifier (GUTI) or Serving-Temporary Mobile Subscriber Identifier (S-TMSI). The appropriate AMF UE NGAP ID is assigned according to the information carried by the UE during the attach process or service request, e.g., GUTI or S-TMSI.

According to an example embodiment, the RAN may use the AMF UE NGAP ID as the identifier of the UE (i.e., UEID) and transmits the UE NGAP ID to the Non-RT RIC and the nRT RIC.

According to an example embodiment, the access network devices O-CU/O-DU, Non RT RIC, and nRT RIC use the UEID for information interaction and data acquisition.

A brief description of the operation according to an example embodiment of the disclosure is first described below.

According to an example embodiment, after the AMF assigns to the UE the AMF UE NGAP ID, the AMF establishes and maintains the mapping table of GUTI, IMSI and AMF UE NGAP ID. When the GUTI and AMF UE NGAP ID in the mapping table change, the AMF may update the mapping table in time, which is referred to as ID mapping table for the convenience of description as shown in Table 2 below.

TABLE 2

| IMSI | GUTI | AMF UE NGAP ID |
|---|---|---|

According to an example embodiment, when the UE accesses the 4G/5G network again, the AMF may find the corresponding AMF UE NGAP ID according to the GUTI carried by the UE and the above ID mapping table, and assign AMF UE NGAP ID to the RAN.

According to an example embodiment, the RAN may use the AMF UE NGAP ID assigned by the AMF as the UE ID and transmits AMF UE NGAP ID to the nRT RIC through the UE ID indication message of the interface E2. As an example, Table 3 shows the details of the UE ID indication message of the interface E2.

TABLE 3

| E2 UE ID indication message |
|---|
| Message type |
| E2 RAN ID |
| E2 nRT RIC ID |
| UEID |

According to an example embodiment, the nRT RIC may transmit the UE ID to the Non-RT RIC through the UE ID indication message for the interface A1. As an example, Table 4 shows the details of the UE ID indication message for the interface A1.

TABLE 4

| A1 UE ID indication message |
|---|
| Message type |
| A1 nRT RIC ID |
| A1 Non-RT RIC ID |
| UEID |

According to an example embodiment, the AMF may update the AMF UE NGAP ID through the UE context modification request message, which is an existing 3GPP message, as shown in Table 5 below. For example, the message carries the 2 AMF UE NGAP IDs before and after the update.

TABLE 5

| UE context modification request message |
|---|
| Message type |
| AMF UE NGAP ID |
| RAN UE NGAP ID |
| RAN paging priority |
| Security key |
| New AMF UE NGAP ID |

According to an example embodiment, the RAN may use the AMF UE NGAP ID updated by the AMF (i.e., New AMF UE NGAP ID), as the new UE ID and transmits AMF UE NGAP ID to the nRT RIC through the UE ID update message of the interface E2. As an example, Table 6 shows the details of the UE ID update message of the interface E2.

TABLE 6

| E2 UE ID update message |
|---|
| Message type |
| E2 RAN ID |
| E2 nRT RIC ID |
| UEID |

According to an example embodiment, the nRT RIC may transmit the UE ID to the Non-RT RIC through the UE ID update message for the interface A1. As an example, Table 7 shows the details of the UE ID update message for the interface A1.

TABLE 7

| A1 UE ID update message |
|---|
| Message type |
| A1 nRT RIC ID |
| A1 Non-RT RIC ID |
| UEID |

According to an example embodiment, the AMF may set a timer, release the ID mapping table when the timer expires and transmit a UE ID release message to the Non-RT RIC. As an example, Table 8 shows the details of the UE ID release message.

TABLE 8

| UE ID release message |
|---|
| Message type |
| AMF ID |
| Non-RT RIC ID |
| UEID |

According to an example embodiment, the Non-RT RIC may transmit an A1 UE ID release message to the nRT RIC. As an example, Table 9 shows the details of the UE ID release message for the AI interface.

TABLE 9

| A1 UEID release message |
|---|
| Message type |
| A1 nRT RIC ID |
| A1 Non-RT RIC ID |
| UEID |

According to an example embodiment, the Non-RT RIC may transmit an enriched data request message to the AMF for requesting enriched data. For example, the enriched data may be GPS information, APP data, etc. As an example, Table 10 shows the details of the enriched data request message.

TABLE 10

| Enriched data request message |
|---|
| Message type |
| AMF ID |
| Non-RT RIC ID |
| UEID |
| Data type |

According to an example embodiment, the AMF may find the corresponding IMSI according to the UEID in the enriched data request message and transmit a request message to the enriched data server to request the enriched data of that IMSI.

According to an example embodiment, the AMF may transmit the enriched data to the Non-RT RIC through an enriched data response message, As an example, Table 11 shows the details of the enriched data response message.

TABLE 11

| Enriched data response message |
|---|
| Message type |
| AMF ID |
| Non-RT RIC ID |
| UEID |
| Enriched data container |

From the above processes, it may be seen that in the new method of assigning UEID provided by one or more aspect of the disclosure, UEID when being assigned is not associated with IMSI/SUCI/SUPI, which ensures security, and when the network status of the UE changes, it may ensure that the UEID in each network device is updated synchronously, thus avoiding the problem of non-correspondence of information. A detailed description of a communication method provided by example embodiment of the disclosure from the perspective of the Non-RT RIC in the AMF/MME of the core network device, the O-CU/O-DU of the first access network device and the SMO of the second network device, respectively, is presented below in conjunction with the attached FIGS. 3 to 5.

According to an example embodiment, a communication method 100, as shown in FIG. 3, may be applied to a core network device AMF or MME. According to an example embodiment, the method 100 may include the following operations:

Operation 110: receiving a message transmitted by a first access network device, the message containing a first identifier or a third identifier of a UE;

Operation 120: assigning to the UE a second identifier corresponding to the first identifier or the third identifier, according to the first identifier or the third identifier of the UE; and Operation 130: transmitting a first request message to the first access network device, the first request message carrying the second identifier so that the first access network device uses the second identifier as an identifier of the UE to communicate with a network device in an O-RAN.

According to an example embodiment, the first access network device may be an Open Centralized Unit (O-CU) or an Open Distributed Unit (O-DU), and the network device in the O-RAN may include: a Non-Real-Time radio access network (RAN) Intelligent Controller (Non-RT RIC) and a Near-real-time RAN Intelligent Controller (nRT RIC), wherein the Non-RT RIC is located within a Service Management Orchestrator (SMO).

According to an example embodiment, the first identifier may be the International Mobile Subscriber Identifier (IMSI), and when the UE is initially attached to the network, the core network device may assign the second identifier to the UE. According to an example embodiment, the core network device may assign the second identifier to the UE according to the existing policy. According to an example embodiment, the second identifier may be the identifier assigned to the UE by the core network device. For example, the second identifier may be AMF UE NGAP ID (identifier assigned by the AMF of the 5G core network) or MME S1AP ID (identifier assigned by the MME of the 4G core network).

According to an example embodiment, when the network status of the UE changes, the communication method of the disclosure may ensure that the UEIDs in each network device are updated synchronously, thus avoiding the problem of non-correspondence information. Moreover, since no IMSI/SUCI/SUPI is associated with the UEID when it is assigned, security is guaranteed.

In some example embodiments, operation 120 may specifically include assigning to the UE, a second identifier corresponding to the third identifier according to the mapping relationship between the identifiers, as well as the third identifier.

Specifically, according to example embodiment, before operation 120, the method 100 may further include:

Operation 12: assigning a third identifier to the UE and establishing the mapping relationship, wherein the mapping relationship is the mapping among the first identifier, the second identifier and the third identifier. Here, the third identifier may be a Globally Unique Temporary Identifier GUTI and the mapping relation may include a mapping relationship of IMSI, GUTI and the second identifier.

In other words, when the UE is initially attached (e.g., the first time the UE is connected) to the network, the AMF needs to assign to the UE the target terminal identifier according to the IMSI carried in the UE initial message and transmit it to the first access network device O-CU/O-DU, which may set the target terminal identifier to the UE ID and then transmit it to other access network devices. According to an example embodiment, the specific transmission process may include: the UE ID indication message is transmitted on interface E2 to the nRT RIC in another access network device, and then the UE ID indication message is transmitted on the interface A1 to the Non-RT RIC in the other access network device, where the UE ID is carried in the above UE ID indication message. Thus ensuring that the UEIDs in each network device are consistent.

In addition, the AMF may assign the GUTI to the UE and transmit the attachment acceptance message to the UE after establishing the ID mapping table containing the mapping relationship between the IMSI, GUTI and the target terminal identifier.

According to another example embodiment, where the message carries operation S-TMSI, then the UE enters the connected state from the idle state, then operation 120 may include:

Operation 121: generating the GUTI according to the S-TMSI; and

Operation 122: assigning to the UE a second identifier corresponding to the GUTI according to the GUTI and the ID mapping relationship.

In other words, when the UE enters the connected state from the idle state, the GUTI may be generated according to the S-TMSI carried in the initial message of the UE, which is actually the GUTI assigned in operation 12 above, and then the ID mapping table is queried according to the GUTI to obtain the second identifier corresponding to the GUTI to assign it to the UE.

According to another example embodiment, where the message carries a third identifier of the GUTI, the UE may attach to the network again, and then operation 120 is include the following:

Operation 123: assigning to the UE a second identifier corresponding to the GUTI according to the GUTI and the ID mapping relationship.

That is, when the UE attaches to the network again, the method may include querying the ID mapping table according to the GUTI carried in the initial message of the UE (which is actually the GUTI assigned in operation 12 above) and get the second identifier corresponding to the GUTI to assign it to the UE.

The above is the process of reassigning the second identifier to the UE in two cases, when the UE enters the connected state from the idle state and when it attaches to the network again.

According to another example embodiment, after operation 130, the method 100 may further include:

Operation 14: upon receiving a first response message transmitted by the first access network device, assigning to the UE an updated second identifier and updating the ID mapping relationship according to the updated second identifier. According to an example embodiment, the first response message may carry a second identifier corresponding to the GUTI;

Operation 140: transmitting a second request message to the first access network device, the second request message carrying an updated second identifier and a second identifier corresponding to the third identifier, so that the first access network device uses the updated second identifier as a new identifier for the UE to communicate with the network device in the O-RAN.

In other words, the UEID is reassigned and updated in each network device according to the mapping relationship and the third identifier, so that the UEIDs in each network device change synchronously to avoid the problem of non-correspondence information.

According to an example embodiment, a real-time updated third identifier may be assigned to the UE and the mapping relationship may be updated according to the updated third identifier.

Moreover, the process of reassigning UEIDs and updating the UEIDs in each network device according to the mapping relationship and the third identifier uses the latest mapping relationship, which may be either the latest established or the latest updated.

According to some example embodiments, the method 100 may further include:

Operation 150: transmitting a release message to the network device in the O-RAN when the set timer expires, and at the same time, releasing the mapping relationship. For example, the release message may carry the UE ID for indicating that the mapping relationship corresponding to that UE ID has been released;

According to an example embodiment, since the first access network device has used the second identifier as the UEID, and the UEID carried in the release message is in essence the second identifier.

Specifically, in the example embodiment, the timer is set according to the service type or terminal type of the UE. In other words, different timers are set for different business types, or different timers are set for different terminal types. For example, the timer of industrial Internet terminal may be set to 10 days, and the timer of personal intelligent terminal may be set to 3 days, 5 days, etc. It should be understood that the data herein are intended only to exemplarily illustrate the technical solutions of embodiments of the disclosure and do not constitute any limitation to the embodiments of the disclosure.

According to some example embodiments, the method 100 may further include:

Operation 160: receiving a third request message from a second network device in the O-RAN, the third request message carrying the second identifier to request data of the UE on the external device;

Operation 170: determining the first identifier corresponding to the second identifier according to the second identifier and the ID mapping relationship;

Operation 180: transmitting a fourth request message to the external device, the fourth request message carrying the first identifier to request data of the UE on the external device;

Operation 185: receiving a fourth response message from the external device, the fourth response message including the first identifier and data of the UE;

Operation 190: determining the second identifier according to the ID mapping relationship and the first identifier carried in the fourth response message; and Operation 195: transmitting a third response message to the second network device, the third response message including the second identifier and data of the UE.

In other words, after the UEID is assigned, the data related to the UE may be acquired from the external device, and the data acquired may be made to correspond to the UEID by the above method.

In the example embodiment, the second network device may be a Service Management Orchestrator (SMO).

According to an example embodiment, a communication method 200, as shown in FIG. 4, may be applied to a core network device AMF or MME. According to an example embodiment, the method 100 may include the following operations:

According to an example embodiment, a communication method 200 as shown in FIG. 4, may be applied to a first access network device O-CU/O-DU. According to an example embodiment, the method 200 may include the following operations:

Operation 210: transmitting a message to a core network device, the message containing a first identifier or a third identifier of a UE;

Operation 220: receiving a first request message transmitted by the core network device, the first request message carrying a second identifier corresponding to the first identifier or the third identifier assigned to the UE by the core network device; and Operation 230: setting the second identifier as the identifier of the UE, i.e., UEID, to communicate with the network device in the O-RAN.

According to an example the embodiment, the first identifier may be an International Mobile Subscriber Identifier (IMSI) and the second identifier may be an identifier assigned to the UE by the core network device. The third identifier may be one of the following:

a Globally Unique Temporary UE Identifier (GUTI); and a Serving-Temporary Mobile Subscriber Identifier (S-TMSI).

According to an example embodiment, the UEID may be used for communicating between the first access network device and the network device in the O-RAN.

According to another example embodiment, the method 200 may further include:

Operation 240: transmitting the UEID in a first message to the network device in the O-RAN, to communicate between the first access network device and the network device in the O-RAN using the UEID. The first message may be a UEID indication message.

According to another example embodiment, the method 200 may further include:

Operation 250: transmitting an initial message to the core network device so that the core network device assigns to the UE an updated second identifier according to a mapping relationship between the network state of the UE, the information carried in the initial message and the established identifier.

According to another example embodiment, the method 200 may further include:

Operation 260: receiving a second request message transmitted by the core network device, the second request message carrying an updated second identifier and a second identifier corresponding to the third identifier; and Operation 265: setting the updated second identifier to a new identifier of the UE, i.e., a new UEID, to communicate with the network device in the O-RAN.

According to another example embodiment, communication between the first access network device and the network device in the O-RAN may be performed using the new UEID.

According to another example embodiment, the method 200 may further include:

Operation 270: transmitting the new UEID in a second message to the network device in the O-RAN to communicate between the first access network device and the network device in the O-RAN using the new UEID. The second message may be a UEID update message.

In some example embodiments, the first request message transmitted in operation 220 may carry a second identifier corresponding to the third identifier GUTI;

According to another example embodiment, the method 200 may further include:

Operation 280: transmitting a first response message to the core network device according to the first request message, the first response message carrying a second identifier corresponding to the GUTI.

Thereafter, the second request message received in operation 260 carries the second identifier corresponding to the GUTI and the updated second identifier.

According to an example embodiment, the second request message carries an old ID and a new ID, both of which correspond to the GUTI, and when resetting the UEID, it is possible to ensure that the UEID is set for the same UE according to the correspondence between the old ID and the new ID. Moreover, the method includes setting the new second identifier as the new UEID, and carrying the new UEID in the UEID update message to be transmitted to the O-RAN in the network devices, thereby ensuring that when the network state of the UE changes, the identifier of the UE in each network device is changed synchronously to avoid the problem of non-correspondence information.

According to another example embodiment, the method 200 may further include:

Operation 290: reporting to the second network device in the O-RAN the network information of the UE corresponding to the second identifier, so that the second network device in the O-RAN associates the network information of the UE with the second identifier carried in the third response message transmitted by the core network device.

According to an example embodiment, the second network device is a Service Management Orchestrator (SMO).

In other words, according to an example embodiment, even if the information of the same UE is acquired from both sides of the network side and the external device respectively, the information from both sides may be made to be associated with that UE by the UEID.

FIG. 5 illustrates a communication method according to another example embodiment. For example, FIG. 5 illustrates a communication method 300, which may be applied to a network device Non-RT RIC in an O-RAN, the Non-RT RIC being located within a Service Management Orchestrator (SMO). According to an example embodiment, the method 300 includes the following operations:

Operation 310: receiving a first message, i.e., a UEID indication message, transmitted by a first access network device, wherein the UEID indication message carries an identifier of a UE (i.e., a UEID). The UEID may be set by the first access network device according to a second identifier assigned by a core network device to the UE, and Operation 320: communicating with the first access network device using the terminal identifier UEID.

According to another example embodiment, the method 300 may further include:

Operation 330: receiving a second message, i.e., a UEID update message, transmitted by the first access network device. The UEID update message may carry a new identifier of the UE, i.e., a new UEID, the new UEID being acquired by the first access network device according to an updated second identifier set by the core network device assigned to the UE; and Operation 340: communicating with the first access network device using the new UEID.

According to another example embodiment, the method 300 may further include:

> Operation 350: receiving a release message transmitted by the core network device and releasing the UEID carried in the release message.

According to another example embodiment, the method 300 may further include:

> Operation 360: transmitting a third request message to the core network device, the third request message carrying the second identifier to request data of the UE on the external device,
>
> Operation 370: receiving a third response message transmitted by the core network device, the third response message carrying a second identifier and data of the UE,
>
> Operation 380: receiving the network information of the UE corresponding to the second identifier reported by the first access network device, and
>
> Operation 390: associating the second identifier carried in the third response message with the network information of the UE.

The following describes in detail the information interaction process of new UEID assignment, update and release, and data acquisition in the application embodiment in conjunction with the attached FIGS. 6A, 6B, 7A, 7B, 8A, 8B, 9, 10A and 10B.

FIGS. 6A and 6B illustrate an interaction process for the new UEID assignment scheme when the UE is initially attached to the network. According to an example embodiment, the interaction process includes:

> 71: a UE transmits a wireless resource control setup request message to a first access network device O-CU/O-DU;
>
> 72: the O-CU/O-DU transmits a wireless resource control setup message to the UE;
>
> 73: upon receiving the wireless resource control setup message from the O-CU/O-DU, the UE transmits a wireless resource control setup completion message to the O-CU/O-DU, where the message carries the GUTI or IMSI for the attachment request;
>
> 701: the O-CU/O-DU transmits an initial UE message (i.e., the second initial message above) to a core network device AMF, the initial UE message carrying the IMSI;
>
> 702: upon receiving the initial UE message, the AMF assigns to the UE a second identifier AMF UE NGAP ID according to the existing policy;
>
> 703: the AMF transmits an initial context setup request message (i.e., the first request message above) to the O-CU/O-DU, where the message carries the AMF UE NGAP ID, which is an existing 3GPP message and is not described in detail here;
>
> 74: the O-CU/O-DU transmits an initial context setup response message to the AMF, where the message carries the assigned AMF UE NGAP ID;
>
> 704: upon receiving the AMF UE NGAP ID, the O-CU/O-DU sets the AMF UE NGAP ID as a UE ID;
>
> 705: the O-CU/O-DU transmits a UE ID indication message on an interface E2 to the nRT RIC in other access network devices. According to an example embodiment, the UE ID indication message carries the UE ID, which the specific structure and content of the UE ID indication message is shown in Table 3 above;
>
> 706: the nRT RIC transmits the UE ID indication message to the Non-RT RIC in the other access network devices on interface A1, the UE ID indication message carrying > the UE ID, which the specific structure and content of the UE ID indication message is shown in Table 4 above;
>
> 707: the AMF assigns to the UE the GUTI and establishes the ID mapping table, which has the structure and content as shown in Table 2 above;
>
> 708: the AMF transmits an attachment acceptance message to the UE, the attachment acceptance message carrying the GUTI;
>
> 7091: when the UE enters the idle state from the connected state, the O-CU/O-DU transmits an RRC release message to the UE. The process of reassigning the UE ID after the UE enters the connected state again from the idle state is shown in FIG. 7a and FIG. 7b below.
>
> 7092: When the UE is de-attached, the AMF assigns a new GUTI for the next attachment process of the UE and at the same time, the AMF updates the mapping table of GUTI, IMSI and AMF UE NGAP ID. The process of reassigning the UE ID after the UE is reattached is shown in FIG. 9 below.

In other words, operations 701 to 708 complete the initial assignment of UEID, and the purpose of the assignment is to ensure that the UEID in each network device are updated synchronously when the network state of the UE changes (e.g., the UE changes from the idle state to the connected state or the UE attaches to the network again), so as to avoid the problem of non-correspondence of information.

FIGS. 7A and 7B illustrate an interaction process for the reassignment scheme of the new UEID during the process of the UE from the idle state to the connected state. According to to an example embodiment, the interaction process includes:

> 81: the UE transmits a wireless resource control setup request message to the O-CU/O-DU, where the message carries the S-TMSI;
>
> 82: the O-CU/O-DU transmits a wireless resource control setup message to the UE;
>
> 83: upon receiving the wireless resource control setup message from the O-CU/O-DU, the UE transmits a wireless resource control setup completion message to the O-CU/O-DU;
>
> 801: the O-CU/O-DU transmits an initial UE message (i.e., the message above) to the AMF, the initial UE message carrying the S-TMSI;
>
> 802: Upon receiving the initial UE message, the AMF generates the GUTI through the S-TMSI and queries the ID mapping table (the structure and content of the mapping table is shown in Table 3 above) according to the GUTI to assign the AMF UE NGAP ID corresponding to the current GUTI;
>
> 803: the AMF transmits an initial context setup request message carrying the assigned AMF UE NGAP ID (i.e., the first request message above) to the O-CU/O-DU;
>
> 84: the O-CU/O-DU transmits an initial context setup response message to the AMF, where the message carries the assigned AMF UE NGAP ID;
>
> 804: upon receiving the initial context setup response message (i.e., the first response message above) transmitted by the O-CU/O-DU, the AMF assigns a new AMF UE NGAP ID, and updates the mapping table of GUTI, IMSI and AMF UE NGAP ID;
>
> 805: the AMF transmits a UE context modification request message (i.e., the second request message above) to the O-CU/O-DU and transmits the updated AMF UE NGAP ID to the O-CU/O-DU, which has the structure and specific content as shown in Table 6 above;

806: upon receiving a new AMF UE NGAP ID, the O-CU/O-DU sets the AMF UE NGAP ID as the UEID;

807: the O-CU/O-DU transmits a UE ID update message to the nRT RIC on interface E2, the UE ID update message carrying the new UE ID, which has the structure and specific content of the UE ID update message as shown in Table 6 above;

808: the nRT RIC transmits a UE ID update message to the Non-RT RIC at the interface A1, the UE ID update message carrying the new UE ID information, which has the structure and specific content of the UE ID update message as shown in Table 7 above.

FIGS. 8A and 8B illustrate an interaction process for the new UEID reassignment scheme when the UE is attached to the network again. According to an example embodiment, the interaction process includes:

91: a UE transmits a wireless resource control setup request message to a first access network device O-CU/O-DU;

92: the O-CU/O-DU transmits a wireless resource control setup message to the UE;

93: upon receiving the wireless resource control setup message from the O-CU/O-DU, the UE transmits a wireless resource control setup completion message to the O-CU/O-DU, where the message carries the GUTI for the attachment request;

901: the O-CU/O-DU transmits an initial UE message (i.e., the message above) to the AMF, the initial UE message carrying the GUTI;

902: upon receiving the initial UE message, the AMF queries the ID mapping table (the structure and content of the mapping table is shown in Table 1 above) according to the received GUTI and assigns the AMF UE NGAP ID corresponding to the current GUTI;

903: the AMF transmits an initial context setup request message (i.e., the first request message above) to the O-CU/O-DU, where the message carries the assigned AMF UE NGAP ID;

94: the O-CU/O-DU transmits an initial context setup response message (i.e., the first response message above) to the AMF, where the message carries the assigned AMF UE NGAP ID;

904: upon receiving the initial context setup response message from the O-CU/O-DU, the AMF assigns a new AMF UE NGAP ID, and updates the mapping table of GUTI, IMSI and AMF UE NGAP ID;

905: the AMF transmits a UE context modification request message (i.e., the second request message above) to the O-CU/O-DU and transmits the updated AMF UE NGAP ID to the O-CU/O-DU, which has the structure and specific content as shown in Table 5 above;

906: upon receiving a new AMF UE NGAP ID, the O-CU/O-DU sets the AMF UE NGAP ID as the UE ID;

907: the O-CU/O-DU transmits a UE ID update message to the nRT RIC on interface E2, the UE ID update message carrying the new UE ID, which has the structure and specific content of the UE ID update message as shown in Table 6 above;

908: the nRT RIC transmits a UE ID update message to the Non-RT RIC at the interface A1 the UE ID update message carrying the new UE ID information, which has the structure and specific content of the UE ID update message as shown in Table 6 above.

FIG. 9 illustrates an interaction process for the new release of UEID after the new UEID assignment scheme is completed. According to an example embodiment, the interaction process includes:

1001: an AMF triggers a UEID release process. Specifically, the UEID may be released by means of a timer. The timer may be set separately according to the service and terminal type. An ID mapping table is released when the timer expires.

1002: the AMF transmits a UEID release message to the SMO, which has the structure and specific content of the UE ID release message as shown in Table 8 above.

1003: the SMO transmits a UEID release message to the nRT RIC through interface A1, and the structure and specific content of the UE ID release message are shown in Table 9 above.

This completes the release of the previously assigned UEIDs in each access network device. It should be noted that the release here may be understood as deleting the UEID from the core network. For example, if a user of a personal smart terminal goes to a certain place for a short-term business trip and the smart terminal is not in the current core network coverage area after completing the business trip, the UEID assigned to the smart terminal needs to be deleted from the core network.

It should be noted that since the Non-RT RIC is located within the SMO, the SMO shown in FIGS. 6A, 6B, 7A, 7B, 8A, 8B and 9 actually corresponds to the Non-RT RIC described in each of the above example embodiments.

The data may be acquired after the UEID assignment is completed, which is UE related data but not network related, e.g., GPS data, map data, etc., and the process of obtaining the data may be done after the initial UEID assignment is completed or after the UEID reassignment is completed. The following is a detailed description of the colleague method of the application, taking the acquisition of GPS data after the completion of UEID reassignment as an example.

FIGS. 10A and 10B illustrate an interaction process for obtaining data (e.g., obtaining GPS data) after the new UEID assignment or reassignment scheme is completed. According to an example embodiment, the interaction process include:

111: an AMF associates a GUTI, a new AMF UE NGAP ID and an updated mapping table;

112: the AMF transmits a UE context modification request message (i.e., the second request message above) to the O-CU/O-DU and transmits a new AMF UE NGAP ID to the O-CU/O-DU;

113: upon receiving a new AMF UE NGAP ID, the O-CU/O-DU sets the AMF UE NGAP ID as the UEID;

114: the O-CU/O-DU transmits a UE ID update message to the nRT RIC on interface E2, the UE ID update message carrying the new UE ID;

115: the nRT RIC transmits a UE ID update message to the Non-RT RIC on interface A1, the UE ID update message carrying the new UE ID information;

1101: the Non-RT RIC (located within the SMO) transmits an enriched data request message (i.e., the third request message above) to the AMF requesting enriched data, such as GPS information, etc., containing the AMF UE NGAP ID in the message, and the structure and specific content of the message may be shown in Table 10 above;

1102: upon receiving the enriched data request message, the AMF looks up the IMSI corresponding to the AMF UE NGAP ID according to the ID mapping table;

1103: transmitting a location service request message (i.e., the fourth request message above) to the location server (E-SMLC), the request carrying the found IMSI, which is an existing 3GPP message and is not described in detail here;

1104: the location server E-SMLC transmits a location service response message (i.e., the fourth response message above) to the AMF, the message carrying the above-mentioned IMSI and its location information in the message, which is an existing 3GPP message and is not described in detail here;

1105: upon receiving the location service response message, it looks up the corresponding AMF UE NGAP ID according to the IMSI carried therein and the ID mapping table, and transmits an enriched data response message (i.e., the third response message above) to the Non-RT RIC, the message containing the found AMF UE NGAP ID, which the structure and specific content of the message may be shown in Table 11 above;

1106: the O-CU/O-DU reports the network information of the UE corresponding to the AMF UE NGAP ID to the nRT RIC through the existing interface E2;

1107: the nRT RIC reports the network information of the UE corresponding to the AMF UE NGAP ID to the SMO through the existing interface A1.

At the point the data acquisition is completed and the SMO may correlate the second identifier carried in the enriched data response message transmitted by the AMF with the network information of the UE reported by the nRT RIC.

It should be understood that operations 81 to 804 of FIGS. 7A and 7B may be included before operation 111 in FIG. 10A.

The communication method provided in each of the above example embodiments contains methods for assigning, reassigning and releasing a new UEID, as well as a process for information interaction, and data of the APP layer corresponding to the UE, such as GPS information, may be acquired according to that UEID.

Adopting the methods according to one or more example embodiments of the disclosure may have at least the following advantages:

1. The UEID is not associated with IMSI/SUCI/SUPI, ensuring security;
2. The UEID may be used in both 4G and 5G networks, and the MME S1AP ID may be used as the UEID in 4G networks;
3. The UEID is unique in AMF set;
4. The UEID is changed synchronously in each network device after the UE has moved from the active state to the idle state and then to the active state;
5. There is no modification to the 3GPP protocol.

FIG. 11 illustrates a communication equipment implement a method described above according to various example embodiments. According to an example embodiment, the communication equipment may be applied to a core network device (e.g., AMF or MME). According to an example embodiment, the communication equipment 400 may include a first receiving module 401, an assignment module 402, and a first transmitting module 403. According to an example embodiment, the communication equipment 400 may perform the communication method 100 described above, and as such, details may not be repeated here.

According to an example embodiment, the first receiving module 401 may be configured to receive a message transmitted by a first access network device, the message containing a first identifier or a third identifier of a UE.

According to an example embodiment, the assignment module 402 may be configured to assign to the UE a second identifier corresponding to the first identifier or the third identifier, according to the first identifier or the third identifier of the UE.

According to an example embodiment, the first transmitting module 403 may be configured to transmit a first request message to the first access network device. According to an example embodiment, the first request message may carry the second identifier assigned to the UE so that the first access network device uses the second identifier as an identifier of the UE to communicate with a network device in an O-RAN.

According to an example embodiment, the first access network device may be an Open Centralized Unit (O-CU) or an Open Distributed Unit (O-DU), and the network device in the O-RAN may include a Non-Real-Time radio access network RAN Intelligent Controller (Non-RT RIC) and a Near-real-time RAN Intelligent Controller (nRT RIC).

According to an example embodiment, the assignment module 402 may be configured to assign to the UE a second identifier corresponding to the third identifier according to the mapping relationship between the identifiers as well as the third identifier.

According to an example embodiment, the assignment module 402 may be further configured to assign a third identifier to the UE and establishing the mapping relationship. The third identifier may be a Globally Unique Temporary Identifier GUTI and the mapping relationship may be a mapping relationship between the first identifier, the second identifier and the third identifier, e.g., a mapping relationship between IMSI, GUTI and the second identifier.

According to an example embodiment, when the message carries an S-TMSI, the UE enters the connected state from the idle state, and the assignment module 403 may generate the GUTI according to the S-TMSI. Moreover, the assignment module 403 may assign, to the UE, a second identifier corresponding to the GUTI according to the GUTI and the ID mapping relationship. an.

According to an example embodiment, when the message carries a third identifier of the GUTI, the UE is again attached to the network, and the assignment module 402 may assign, to the UE, a second identifier corresponding to the GUTI, according to the GUTI and the ID mapping relationship.

According to an example embodiment, the first request message transmitted by the first transmitting module 403 to the first access network device may carry a second identifier corresponding to the GUTI.

According to an example embodiment, the assignment module 402 may be configured, upon receiving a first response message transmitted by the first access network device, to assign to the UE an updated second identifier and update the ID mapping relationship according to the updated second identifier. The first response message carries a second identifier corresponding to the GUTI;

According to an example embodiment, the first transmitting module 403 may be further configured to transmit a second request message to the first access network device, the second request message carrying an updated second identifier and a second identifier corresponding to the GUTI, so that the first access network device uses the updated second identifier as a new identifier for the UE to communicate with the network device in the O-RAN.

According to an example embodiment, the communication equipment may further include an update module may be configured to update the mapping relationship according to the updated second identifier, is further included.

According to an example embodiment, the assignment module 402 may be further configured to assign an updated third identifier to the UE. The update module may be further configured to update the mapping relationship according to the updated third identifier. According to an example embodiment, the first transmitting module 403 may be further configured, when the set timer expires, to transmit a release message to the network device in the O-RAN while, at the same time, to release the mapping relationship between the identifiers, wherein the UEID release message carries the UE's identifier UEID for indicating that the mapping relationship corresponding to the UE ID has been released.

According to an example embodiment, the timer is set according to the service type or terminal type of the UE.

According to an example embodiment, the communication equipment 400 may further include a processing module.

According to an example embodiment, the first receiving module 401 may be further configured to receive a third request message from a second network device in the O-RAN, the third request message carrying the second identifier for requesting data of the UE on the external device, and the processing module may be configured to determine the first identifier corresponding to the second identifier according to the second identifier and identifiers mapping relationship.

Further, the first transmitting module 403 may be further configured to transmit a fourth request message to the external device, the fourth request message carrying the first identifier for requesting data of the UE on the external device, the first receiving module 401 may be further configured to receive a fourth response message from the external device, the fourth response message including the first identifier and data of the UE, the processing module may be further configured to, according to the mapping relationship of the identifiers and the first identifier carried in the fourth response message, determine the second identifier, and the first transmitting module 403 may be further configured to provide a third response message to the second network device, the third response message including the second identifier and data of the UE.

According to an example embodiment, the second network device is a Service Management Orchestrator (SMO).

The first identifier is an international mobile subscriber identifier code IMSI, the second identifier is an identifier assigned to the UE by the core network device, and the third identifier is one of the following:
Globally Unique Temporary UE Identifier (GUTI); and
Serving-Temporary Mobile Subscriber Identifier (S-TMSI).

FIG. 12 is a schematic structural diagram of a communication equipment according to another example embodiment of the disclosure. According to an example embodiment, the communication equipment illustrated in FIG. 12 may be applied to a first access network device. According to an example embodiment, the communication equipment 500 may include a second transmitting module 501, a second receiving module 502, and a processing module 503. According to an example embodiment, the communication equipment 500 may perform the communication method 200 described above, and as such, details may not be repeated here.

According to an example embodiment, the second transmitting module 501 is configured to transmit a message to a core network device. The message may contain a first identifier or residence a third identifier of a UE;

According to an example embodiment, the second receiving module 502 is configured to receive a first request message transmitted by the core network device. The first request message may carry a second identifier corresponding to the first identifier or the third identifier assigned to the UE by the core network device.

According to an example embodiment, the processing module 503 is configured to set the second identifier as an identifier of the UE for communicating with communicating with a network device in an O-RAN.

According to an example embodiment, the core network device is an Access and Mobility management Function entity (AMF) or a Mobility Management Entity (MME), and the network device in the O-RAN include: a Non-Real-Time radio access network (RAN) Intelligent Controller (Non-RT RIC) and a Near-real-time RAN Intelligent Controller (nRT RIC).

According to an example embodiment, the communication equipment 500 may further include a transmitting module configured to transmit the identifier of the UE carried in a first message to the network device in the O-RAN.

According to an example embodiment, the second receiving module 502 is further configured to receive a second request message from the core network device. The second request message may carry an updated second identifier and a second identifier corresponding to the third identifier.

According to an example embodiment, the processing module 503 may be further configured to set the updated second identifier as the new identifier of the UE to communicate with the network device in the O-RAN.

According to an example embodiment, the transmitting module may be further configured to transmit the new identifier of the UE carried in a second message to the network device in the O-RAN. According to an example embodiment, the second receiving module 502 may be further configured to receive the first request message from the core network device. The first request message may carry a second identifier corresponding to a third identifier, the third identifier being that assigned by the core network device to the UE.

According to an example embodiment, the second transmitting module 501 may be further configured, to transmit a first response message to the core network device according to the first request message. The first response message may carry a second identifier corresponding to the third identifier, and the received second request message may carry a second identifier corresponding to the third identifier and the updated second identifier.

According to an example embodiment, the second transmitting module 501 may be further configured to report to the second network device in the O-RAN the network information of the UE corresponding to the second identifier, so that the second network device in the O-RAN associates the network information of the UE with the second identifier carried in the third response message transmitted by the core network device.

According to an example embodiment, the second network device may be a Service Management Orchestrator (SMO).

FIG. 13 is a schematic structural diagram of a communication equipment according to another example embodiment of the disclosure. According to an example embodiment, a communication equipment 600, as shown in FIG. 13, may be applied to other access network devices. According to an example embodiment, the communication equipment 600 may include a third receiving module 601 and a communication module 602. According to an example embodiment, the communication equipment 600 may perform the communication method 300 described above, and as such specific details may not be repeated here.

According to an example embodiment, the third receiving module 601 is configured to receive a first message transmitted by a first access network device. The first message may carry an identifier of a UE, the identifier of the UE being set by the first access network device in accordance with a second identifier assigned to the UE by a core network device; and According to an example embodiment, the communication module 602 is configured to communicate with the first access network device using the identifier of the UE.

According to an example embodiment, the core network device is an Access and Mobility management Function entity (AMF) or a Mobility Management Entity (MME), and the first access network device is an Open Centralized Unit (O-CU) or an Open Distributed Unit (O-DU).

According to an example embodiment, the third receiving module 601 is configured to receive a second message transmitted by the first access network device, wherein the first message carries a new identifier of the UE, which is set by the first access network device according to an updated second identifier assigned to the UE by the core network device.

The communication module is further configured to communicate with the first access network device using the new identifier of the UE.

According to an example embodiment, the third receiving module 601 is further configured to receive a release message from the core network device and to release the UE's identifier UEID carried in the UEID release message.

According to an example embodiment, the communication equipment 600 may include a third transmitting module and an association module.

According to an example embodiment, the third transmitting module may be configured to transmit a third request message to the core network device. The third request message may carry the second identifier to request data of the UE on the external device;

According to an example embodiment, the third receiving module 601 may be further configured to receive a third response message transmitted by the core network device, the third response message carrying a second identifier and data of the UE.

According to an example embodiment, the third receiving module 601 may be further configured to receive the network information of the UE corresponding to the second identifier reported by the first access network device.

According to an example embodiment, the association module may be configured to associate the second identifier carried in the third response message with the network information of the UE.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to an aspect of the disclosure, an electronic device is provided having a schematic structure as shown in FIG. 14. The electronic device 1200 includes a processor 1201, a memory 1202 and a bus 1203, the processor 1201 is connected to the memory 1202 through the bus 1203, the memory 1202 is configured to store machine readable instructions, and the instructions, when executed by the processor 1201, implement the communication method described in any of the above embodiments.

The processor 1201 may be a Central Processing Unit (CPU), a general-purpose processor, a Digital Signal Processor (DSP), an Application Specific Integrated Circuit (ASIC), a Field Programmable Gate Array (FPGA) or other programmable logic devices, transistor logic devices, hardware components or any combination thereof. It may implement or execute various exemplary logic boxes, modules, and circuits described in conjunction with the disclosure. The processor 1201 may also be a combination that implements computing functions, such as a combination containing one or more microprocessors, a combination of a DSP and a microprocessor, etc.

The bus 1203 may include a pathway to transmit information between the above components. The bus 1203 may be a Peripheral Component Interconnect (PCI) bus or Extended Industry Standard Architecture (EISA) bus, etc. The bus 1203 may be divided into address bus, data bus, control bus, etc. For ease of representation, only one thick line is shown in FIG. 14, but it does not indicate that there is only one bus or one type of bus.

The memory 1202 may be Read Only Memory (ROM) or other types of static storage devices that may store static information and instructions, Random Access Memory (RAM) or other types of dynamic storage devices that may store information and instructions, or Electrically Erasable Programmable Read Only Memory (EEPROM), Compact Disc Read Only Memory (CD-ROM) or other CD-ROM storage, optical disc storage (including compact discs, laser discs, CD-ROMs, digital general purpose discs, Blu-ray discs), magnetic disc storage medium or other magnetic storage devices, or any other medium capable of carrying or storing desired program code in the form of instructions or data structures and capable of being accessed by a computer, but not limited thereto.

According to an aspect of the disclosure, there is also provide a computer-readable storage medium on which a computer program is stored, which, when run on the computer, enables the computer to execute the corresponding contents of the foregoing communication method embodiment.

Computer-readable storage medium provided by embodiments of the disclosure include, but are not limited to, any type of disk (including floppy disks, hard disks, CD-ROM, and magnetic disks), Read-Only Memory (ROM), Random Access Memory (RAM), Erasable Programmable Read-Only Memory (EPROM), Electrically Erasable Programmable Read-Only Memory (EEPROM), flash memory, magnetic cards, or light cards. That is, a readable storage medium includes any medium that stores or transmits information in a form capable of being read by a device (e.g., a computer).

It should be understood that although the individual operations in the flowchart of the attached figures are shown in sequence as indicated by the arrows, the operations are not necessarily performed in the order indicated by the arrows. Unless explicitly stated herein, these operations are performed in no strict order and they may be performed in any other order. Moreover, at least a portion of the operations in the flowchart of the accompanying drawings may include a plurality of sub-operations or a plurality of phases that are not necessarily executed to completion at the same moment, but may be executed at different moments, but the order in which they are executed is not necessarily sequential, but may be executed in rotation or alternately with other operations or at least portions of sub-operations or phases of other operations.

The technical solutions documented in the embodiments of the application may be combined with each other in any combination without conflict.

Other embodiments of the disclosure may readily occur to those skilled in the art after considering the specification and practicing the application disclosed herein. This application is intended to cover any modification, use or adaptation of the disclosure, which follows the general principles of the disclosure and includes common knowledge or conventional technical means in the technical field not disclosed in this application. The specification and examples are to be regarded as exemplary only, with the true scope and spirit of the application being indicated by the following claims.

Although certain embodiments of the disclosure have been described and shown, it will be understood that modifications may be made thereto without departing from the principles of the disclosure, which should also be regarded as the protection scope of the disclosure.

What is claimed is:

1. A method of communication by a core network device, the method comprising:
   receiving a message transmitted by a first access network device, the message comprising a first identifier of a user equipment (UE);
   assigning to the UE a second identifier based on the first identifier in the received message, wherein the second identifier is to be used as an identifier of the first access network device to communicate with a network device in an Open Radio Access Network (O-RAN); and
   transmitting a first request message to the first access network device, the first request message comprising the second identifier assigned to the UE,
   wherein the first identifier is associated with one of an International Mobile Subscriber Identifier (IMSI), a Globally Unique Temporary UE Identifier (GUTI) and a Serving-Temporary Mobile Subscriber Identifier (S-TMSI).

2. The method of claim 1, wherein the core network device is an Access and Mobility management Function entity (AMF) or a Mobility Management Entity (MME), and
   wherein the first access network device is an Open Centralized Unit (O-CU) or an open distributed unit (O-DU).

3. The method of claim 1, wherein assigning to the UE the second identifier based on the first identifier comprises:
   assigning to the UE the second identifier corresponding to the first identifier, based on a mapping relationship between the first identifier and the second identifier.

4. The method of claim 3, further comprising:
   based on a set timer expiring, transmitting a release message to the network device in the O-RAN; and
   releasing the mapping relationship between the first identifier and the second identifier,
   wherein the release message comprises the second identifier of the UE.

5. The method of claim 3, further comprising:
   receiving a third request message from a Service Management Orchestrator (SMO) in the O-RAN, the third request message comprising the second identifier to request data of the UE on an external device;
   determining the first identifier corresponding to the second identifier according to the mapping relationship between the first identifier and the second identifier;
   transmitting a fourth request message to the external device, the fourth request message comprising the first identifier to request the data of the UE on the external device;
   receiving a fourth response message from the external device, the fourth response message comprising the first identifier and the data of the UE;
   determining the second identifier according to the mapping relationship between the first identifier and the second identifier; and
   transmitting a third response message to the SMO, the third response message comprising the second identifier and the data of the UE.

6. The method of claim 1, further comprising: before the assigning to the UE the second identifier, assigning to the UE a third identifier associated with the GUTI or the S-TMSI and establishing a mapping relationship between the first identifier, the second identifier and the third identifier.

7. The method of claim 6, further comprising:
   transmitting a second request message to the first access network device, the second request message comprising an updated second identifier and the second identifier corresponding to the third identifier, the updated second identifier to be set as a new identifier of the UE by the first access network device to communicate with the network device in the O-RAN.

8. The method of claim 7, further comprising:
   updating the mapping relationship based on the updated second identifier.

9. The method of claim 7, further comprising:
   assigning to the UE an updated third identifier, and
   updating the mapping relationship based on the updated third identifier.

10. The method of claim 1, wherein the network device in the O-RAN comprises a Non-Real-Time radio access network (RAN) Intelligent Controller (Non-RT RIC) and a Near-real-time RAN Intelligent Controller (nRT RIC), and
   wherein the Non-RT RIC is located in a Service Management Orchestrator (SMO).

11. A core network device comprising:
   a transceiver;
   memory storing instructions; and
   a processor coupled to the transceiver and the memory, wherein the instructions, when executed by the processor, cause the core network device to:
   receive a message transmitted by a first access network device, the message comprising a first identifier of a user equipment (UE);
   assign to the UE a second identifier based on the first identifier in the received message, wherein the second identifier is to be used as an identifier of the first access network device to communicate with a network device in an Open Radio Access Network (O-RAN); and
   transmit a first request message to the first access network device, the first request message comprising the second identifier assigned to the UE,
   wherein the first identifier is associated with one of an International Mobile Subscriber Identifier (IMSI), a Globally Unique Temporary UE Identifier (GUTI) and a Serving-Temporary Mobile Subscriber Identifier (S-TMSI).

12. The core network device of claim 11, wherein the core network device is an Access and Mobility management Function entity (AMF) or a Mobility Management Entity (MME), and wherein the first access network device is an Open Centralized Unit (O-CU) or an open distributed unit (O-DU).

13. The core network device of claim 11, wherein for assigning to the UE the second identifier based on the first identifier, the instructions, when executed by the processor, further cause the core network device to:

assign to the UE the second identifier corresponding to the first identifier, based on a mapping relationship between the first identifier and the second identifier.

14. The core network device of claim 13, wherein the instructions, when executed by the processor, further cause the core network device to:

based on a set timer expiring, transmit a release message to the network device in the O-RAN; and release the mapping relationship between the first identifier and the second identifier, and wherein the release message comprises the second identifier of the UE.

15. The core network device of claim 13, wherein the instructions, when executed by the processor, further cause the core network device to:

receive a third request message from a Service Management Orchestrator (SMO) in the O-RAN, the third request message comprising the second identifier to request data of the UE on an external device;

determine the first identifier corresponding to the second identifier according to the mapping relationship between the first identifier and the second identifier;

transmit a fourth request message to the external device, the fourth request message comprising the first identifier to request the data of the UE on the external device;

receive a fourth response message from the external device, the fourth response message comprising the first identifier and the data of the UE;

determine the second identifier according to the mapping relationship between the first identifier and the second identifier; and transmit a third response message to the SMO, the third response message comprising the second identifier and the data of the UE.

16. The core network device of claim 13, wherein the instructions, when executed by the processor, further cause the core network device to:

transmit a second request message to the first access network device, the second request message comprising an updated second identifier and the second identifier corresponding to a third identifier, the updated second identifier to be set as a new identifier of the UE by the first access network device to communicate with the network device in the O-RAN.

17. The core network device of claim 16, wherein the instructions, when executed by the processor, further cause the core network device to:

update the mapping relationship based on the updated second identifier.

18. The core network device of claim 11, wherein the instructions, when executed by the processor, further cause the core network device to:

assign a third identifier to the UE before assigning the second identifier to the UE, and establish a mapping relationship between the first identifier, the second identifier and the third identifier.

19. A first access network device comprising:

a transceiver;

memory storing instructions; and a processor coupled to the transceiver and the memory, wherein the instructions, when executed by the processor, cause the first access network device to:

transmit a message to a core network device, the message comprising a first identifier of a user equipment (UE);

receive a first request message from the core network device, the first request message comprising a second identifier assigned to the UE by the core network device based on the first identifier; and set the second identifier as an identifier of the UE, to communicate with communicating with a network device in an Open Radio Access Network (O-RAN), wherein the first identifier is associated with one of an International Mobile Subscriber Identifier (IMSI), a Globally Unique Temporary UE Identifier (GUTI) and a Serving-Temporary Mobile Subscriber Identifier (S-TMSI).

20. The first access network device according to claim 19, wherein the instructions, when executed by the processor, further cause the first access network device to:

receive a second request message from the core network device, the second request message comprising an updated second identifier and the second identifier corresponding to a third identifier associated with the GUTI or the S-TMSI; and setting the updated second identifier as a new identifier of the UE, to communicate with the network device in the O-RAN.

* * * * *